US009767790B2

(12) United States Patent
Tomita

(10) Patent No.: US 9,767,790 B2
(45) Date of Patent: *Sep. 19, 2017

(54) VOICE RETRIEVAL APPARATUS, VOICE RETRIEVAL METHOD, AND NON-TRANSITORY RECORDING MEDIUM

(71) Applicant: Casio Computer Co., Ltd., Tokyo (JP)

(72) Inventor: Hiroki Tomita, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/953,729

(22) Filed: Nov. 30, 2015

(65) Prior Publication Data

US 2016/0180839 A1 Jun. 23, 2016

(30) Foreign Application Priority Data

Dec. 22, 2014 (JP) .................................. 2014-259419

(51) Int. Cl.
| | |
|---|---|
| *G10L 15/00* | (2013.01) |
| *G10L 15/05* | (2013.01) |
| *G10L 15/02* | (2006.01) |
| *G10L 25/54* | (2013.01) |

(52) U.S. Cl.
CPC .............. *G10L 15/05* (2013.01); *G10L 15/02* (2013.01); *G10L 25/54* (2013.01); *G10L 2015/025* (2013.01)

(58) Field of Classification Search
CPC .... G10L 13/08; G10L 2015/025; G10L 15/26
USPC ................................................. 704/240, 235
See application file for complete search history.

(56) References Cited

U.S. PATENT DOCUMENTS

2005/0203750 A1* 9/2005 Miyamoto .............. G10L 15/26
704/276
2010/0082344 A1* 4/2010 Naik ...................... G10L 13/033
704/258

OTHER PUBLICATIONS

Zhang, Y., et al., An Inner-Product Lower-Bound Estimate for Dynamic Time Warping, ICASSP, 2011, pp. 5660-5663.

* cited by examiner

*Primary Examiner* — Jakieda Jackson
(74) *Attorney, Agent, or Firm* — Scully, Scott, Murphy & Presser, P.C.

(57) ABSTRACT

A voice retrieval apparatus executes processes of: converting a retrieval string into a phoneme string; obtaining, from a time length memory, a continuous time length for each phoneme contained in the converted phoneme string; deriving a plurality of time lengths corresponding to a plurality of utterance rates as candidate utterance time lengths of voices corresponding to the retrieval string based on the obtained continuous time length; specifying, for each of the plurality of time lengths, a plurality of likelihood obtainment segments having the derived time length within a time length of a retrieval sound signal; obtaining a likelihood showing a plausibility that the specified likelihood obtainment segment specified is a segment where the voices are uttered; and identifying, based on the obtained likelihood, for each of the specified likelihood obtainment segments, an estimation segment where utterance of the voices is estimated in the retrieval sound signal.

18 Claims, 13 Drawing Sheets

(WHEN NUMBER OF STATES FOR PHONEME IS "3")
a1 : FIRST STATE INCLUDING UTTERANCE START OF PHONEME "a"
a2 : SECOND STATE INCLUDING INTERMEDIATE STATE OF PHONEME "a"
a3 : THIRD STATE INCLUDING UTTERANCE END OF PHONEME "a"

FIG.4

| PHONEME NAME AND STATE | CONTINUOUS TIME LENGTH (ms) | | | | |
|---|---|---|---|---|---|
| | FAST | SLIGHTLY FAST | NORMAL | SLIGHTLY SLOW | SLOW |
| k1 | 15 | 20 | 25 | 30 | 35 |
| k2 | 20 | 25 | 30 | 35 | 40 |
| k3 | 15 | 20 | 25 | 30 | 35 |
| a1 | 20 | 25 | 30 | 35 | 40 |
| a2 | 30 | 35 | 40 | 45 | 50 |
| a3 | 20 | 25 | 30 | 35 | 40 |
| t1 | 15 | 20 | 25 | 30 | 35 |
| t2 | 20 | 25 | 30 | 35 | 40 |
| t3 | 15 | 20 | 25 | 30 | 35 |
| e1 | 20 | 25 | 30 | 35 | 40 |
| e2 | 30 | 35 | 40 | 45 | 50 |
| e3 | 20 | 25 | 30 | 35 | 40 |
| g1 | 15 | 20 | 25 | 30 | 35 |
| g2 | 20 | 25 | 30 | 35 | 40 |
| g3 | 15 | 20 | 25 | 30 | 35 |
| o1 | 20 | 25 | 30 | 35 | 40 |
| o2 | 30 | 35 | 40 | 45 | 50 |
| o3 | 20 | 25 | 30 | 35 | 40 |
| r1 | 20 | 25 | 30 | 35 | 40 |
| r2 | 25 | 30 | 35 | 40 | 45 |
| r3 | 20 | 25 | 30 | 35 | 40 |
| i1 | 20 | 25 | 30 | 35 | 40 |
| i2 | 40 | 45 | 50 | 55 | 60 |
| i3 | 30 | 35 | 40 | 45 | 50 |
| TOTAL | 515 | 635 | 755 | 875 | 995 |

RETRIEVAL SOUND SIGNAL

| RANKING | FAST | | SLIGHTLY FAST | | NORMAL | | SLIGHTLY SLOW | | SLOW | |
|---|---|---|---|---|---|---|---|---|---|---|
| | LIKELI-HOOD | START POSITION | LIKELI-HOOD | START POSITION | LIKELI-HOOD | START POSITION | LIKELI-HOOD | START POSITION | LIKELI-HOOD | START POSITION |
| 1 | 0.20 | 493 | 0.35 | 495 | 0.40 | 492 | 0.55 | 491 | 0.30 | 2123 |
| 2 | 0.17 | 6114 | 0.21 | 3007 | 0.35 | 6112 | 0.32 | 856 | 0.18 | 1737 |
| 3 | 0.12 | 3477 | 0.18 | 4377 | 0.30 | 7132 | 0.29 | 4968 | 0.16 | 8694 |
| 4 | 0.10 | 6178 | 0.15 | 1687 | 0.27 | 5926 | 0.28 | 5920 | 0.15 | 6111 |
| 5 | 0.09 | 1990 | 0.12 | 1099 | 0.22 | 6068 | 0.25 | 2559 | 0.13 | 5925 |
| 6 | 0.07 | 1194 | 0.11 | 1149 | 0.18 | 1847 | 0.22 | 3217 | 0.11 | 1537 |
| 7 | 0.06 | 5435 | 0.09 | 4354 | 0.15 | 5748 | 0.20 | 5784 | 0.10 | 7130 |
| 8 | 0.05 | 5852 | 0.08 | 8525 | 0.12 | 1539 | 0.18 | 3519 | 0.08 | 1197 |
| 9 | 0.04 | 5496 | 0.06 | 6945 | 0.08 | 2125 | 0.15 | 2512 | 0.07 | 5430 |
| 10 | 0.03 | 5170 | 0.04 | 715 | 0.05 | 6640 | 0.10 | 6460 | 0.05 | 6175 |
| TOTAL | 0.93 | – | 1.39 | – | 2.12 | – | 2.51 | – | 1.33 | – |

FIG.11A

| RANKING OF LIKELI-HOOD | LIKELIHOOD | | | | | | | | | |
|---|---|---|---|---|---|---|---|---|---|---|
| | FAST | | SLIGHTLY FAST | | NORMAL | | SLIGHTLY SLOW | | SLOW | |
| | PRE-CORRECTION | POST-CORRECTION | PRE-CORRECTION | POST-CORRECTION | PRE-CORRECTION | POST-CORRECTION | PRE-CORRECTION | POST-CORRECTION | PRE-CORRECTION | POST-CORRECTION |
| 1 | 0.20 | 2.00 | 0.35 | 3.50 | 0.40 | 4.00 | 0.55 | 5.50 | 0.30 | 3.00 |
| 2 | 0.17 | 1.53 | 0.21 | 1.89 | 0.35 | 3.15 | 0.32 | 2.88 | 0.18 | 1.62 |
| 3 | 0.12 | 0.96 | 0.18 | 1.44 | 0.30 | 2.40 | 0.29 | 2.32 | 0.16 | 1.28 |
| 4 | 0.10 | 0.70 | 0.15 | 1.05 | 0.27 | 1.89 | 0.28 | 1.96 | 0.15 | 1.05 |
| 5 | 0.09 | 0.54 | 0.12 | 0.72 | 0.22 | 1.32 | 0.25 | 1.50 | 0.13 | 0.78 |
| 6 | 0.07 | 0.35 | 0.11 | 0.55 | 0.18 | 0.90 | 0.22 | 1.10 | 0.11 | 0.55 |
| 7 | 0.06 | 0.24 | 0.09 | 0.36 | 0.15 | 0.60 | 0.20 | 0.80 | 0.10 | 0.40 |
| 8 | 0.05 | 0.15 | 0.08 | 0.24 | 0.12 | 0.36 | 0.18 | 0.54 | 0.08 | 0.24 |
| 9 | 0.04 | 0.08 | 0.06 | 0.12 | 0.08 | 0.16 | 0.15 | 0.30 | 0.07 | 0.14 |
| 10 | 0.03 | 0.03 | 0.04 | 0.04 | 0.05 | 0.05 | 0.10 | 0.10 | 0.05 | 0.05 |
| TOTAL | 0.93 | 6.58 | 1.39 | 9.91 | 2.12 | 14.8 | 2.51 | 17.0 | 1.33 | 9.11 |

FIG.11B

| RANKING OF LIKELIHOOD | WEIGHT COEFFICIENT |
|---|---|
| 1 | 10 |
| 2 | 9 |
| 3 | 8 |
| 4 | 7 |
| 5 | 6 |
| 6 | 5 |
| 7 | 4 |
| 8 | 3 |
| 9 | 2 |
| 10 | 1 |

FIG.12

| RANKING | RANKING OF LIKELIHOOD | | | | |
| --- | --- | --- | --- | --- | --- |
| | FAST | SLIGHTLY FAST | NORMAL | SLIGHTLY SLOW | SLOW |
| 1 | 5 | 3 | 2 | 1 | 4 |
| 2 | 5 | 3 | 1 | 2 | 4 |
| 3 | 5 | 3 | 1 | 2 | 4 |
| 4 | 5 | 3 | 2 | 1 | 3 |
| 5 | 5 | 4 | 2 | 1 | 3 |
| 6 | 5 | 3 | 2 | 1 | 3 |
| 7 | 5 | 4 | 2 | 1 | 3 |
| 8 | 5 | 3 | 2 | 1 | 3 |
| 9 | 5 | 4 | 2 | 1 | 3 |
| 10 | 5 | 3 | 2 | 1 | 2 |
| TOTAL | 50 | 33 | 18 | 12 | 28 |

FIG.13A

| SEGMENT | FAST LIKELIHOOD | SLIGHTLY FAST LIKELIHOOD | NORMAL LIKELIHOOD | SLIGHTLY SLOW LIKELIHOOD | SLOW LIKELIHOOD |
|---|---|---|---|---|---|
| 1 | 0.20 | 0.35 | 0.40 | 0.55 | 0.30 |
| 2 | 0.17 | 0.21 | 0.35 | 0.32 | 0.18 |
| 3 | 0.12 | 0.18 | 0.30 | 0.29 | 0.16 |
| 4 | 0.10 | 0.15 | 0.27 | 0.28 | 0.15 |
| 5 | 0.09 | 0.12 | 0.22 | 0.25 | 0.13 |
| 6 | 0.07 | 0.11 | 0.18 | 0.22 | 0.11 |
| 7 | 0.06 | 0.09 | 0.15 | 0.20 | 0.10 |
| 8 | 0.05 | 0.08 | 0.12 | 0.18 | 0.08 |
| 9 | 0.04 | 0.06 | 0.08 | 0.15 | 0.07 |
| 10 | 0.03 | 0.04 | 0.05 | 0.10 | 0.05 |
| TOTAL | 0.93 | 1.39 | 2.12 | 2.51 | 1.33 |

FIG.13B

| SEGMENT | RANKING OF LIKELIHOOD | | | | |
|---|---|---|---|---|---|
| | FAST | SLIGHTLY FAST | NORMAL | SLIGHTLY SLOW | SLOW |
| 1 | 5 | 3 | 2 | 1 | 4 |
| 2 | 5 | 3 | 1 | 2 | 4 |
| 3 | 5 | 3 | 1 | 2 | 4 |
| 4 | 5 | 3 | 2 | 1 | 3 |
| 5 | 5 | 4 | 2 | 1 | 3 |
| 6 | 5 | 3 | 2 | 1 | 3 |
| 7 | 5 | 4 | 2 | 1 | 3 |
| 8 | 5 | 3 | 2 | 1 | 3 |
| 9 | 5 | 4 | 2 | 1 | 3 |
| 10 | 5 | 3 | 2 | 1 | 2 |
| TOTAL | 50 | 33 | 18 | 12 | 28 |

VOICE RETRIEVAL APPARATUS, VOICE RETRIEVAL METHOD, AND NON-TRANSITORY RECORDING MEDIUM

CROSS-REFERENCE TO RELATED APPLICATION

This application claims the benefit of Japanese Patent Application No. 2014-259419, filed on Dec. 22, 2014, the entire disclosure of which is incorporated by reference herein.

FIELD

This application relates generally to a voice retrieval apparatus, a voice retrieval method, and a non-transitory recording medium.

BACKGROUND

Due to widespread popularization of multimedia contents, such as voice and motion image, there is a demand for a highly precise multimedia retrieval technology. With respect to such a technology, a voice retrieval technology that identifies a portion where voices corresponding to a retrieval term (query) subjected to retrieval is uttered in a sound signal has been studied.

As for voice retrieval, a retrieval scheme with a sufficient performance has not been established yet in comparison with character string retrieval technologies based on image recognition. Hence, various technologies have been studied in order to realize a voice retrieval with a sufficient performance.

For example, Non-patent Literature 1 (Y. Zhang and J. Glass, "An inner-product lower-bound estimate for dynamic time warping", in Proc., ICASSP, 2011, pp. 5660-5663) discloses a method of comparing sound signals with each other at a fast speed. This method enables a fast-speed identification of a portion corresponding to a query input by voice in a sound signal subjected to retrieval.

According to the technology disclosed by Non-patent Literature 1, when, however, the utterance rate of voice subjected to retrieval is different from the utterance rate of a person who has input a query, the retrieval precision decreases.

The present disclosure has been made in order to address the aforementioned technical problem, and it is an objective of the present disclosure to provide a voice retrieval apparatus, a voice retrieval method, and a non-transitory recording medium which are capable of highly precisely retrieving a retrieval term from a sound signal with a different utterance rate.

SUMMARY

In order to accomplish the above objective, a voice retrieval apparatus according to an aspect of the present disclosure includes:
a processor; and
a memory that records a sound signal subjected to retrieval,
in which the processor executes following processes:
a converting process of converting a retrieval string into a phoneme string;
a time length obtaining process of obtaining, from a database that stores continuous time length data on a phoneme, a continuous time length for each phoneme contained in the phoneme string converted in the converting process;
a time length deriving process of deriving, based on the continuous time length obtained in the time length obtaining process, a plurality of time lengths corresponding to a plurality of utterance rates different from one another as candidate utterance time lengths of voices corresponding to the retrieval string;
a segment specifying process of specifying, for each of the plurality of time lengths, a plurality of likelihood obtainment segments within the sound signal subjected to retrieval, each of the plurality of likelihood obtainment segments having the time length derived in the time length deriving process;
a likelihood obtaining process of obtaining a likelihood showing a plausibility that the likelihood obtainment segment specified in the segment specifying process is a segment where voices corresponding to the retrieval string are uttered; and
an identifying process of identifying, based on the likelihood obtained in the likelihood obtaining process, an estimation segment where, within the sound signal subjected to retrieval, utterance of voices corresponding the retrieval string is estimated, the estimation segment being identified for each of the likelihood obtainment segments specified in the segment specifying process.

The present disclosure enables highly precise retrieval of a retrieve term from a sound signal that has a different utterance rate.

BRIEF DESCRIPTION OF THE DRAWINGS

A more complete understanding of this application can be obtained when the following detailed description is considered in conjunction with the following drawings, in which:

FIG. 4 is a diagram to explain how to derive an utterance time length corresponding to an utterance rate;

FIG. 7 is a diagram to explain a selection method of a selector for candidate segments;

FIG. 11A is a diagram to explain a method of a selector to select candidate segments after an obtained likelihood weight coefficient is multiplied, and FIG. 11B is a diagram shown an example weight coefficient;

FIG. 12 is a diagram to explain a selection method of the selector for candidate segments; and FIG. 13A is a diagram illustrating the example maximum likelihood of a segment obtained by dividing a sound signal by the selector and shown for each utterance rate, and FIG. 13B is a diagram illustrating an example comparison on a likelihood ranking corresponding to an utterance rate for each segment obtained by dividing the sound signal.

DETAILED DESCRIPTION

Figure 1:
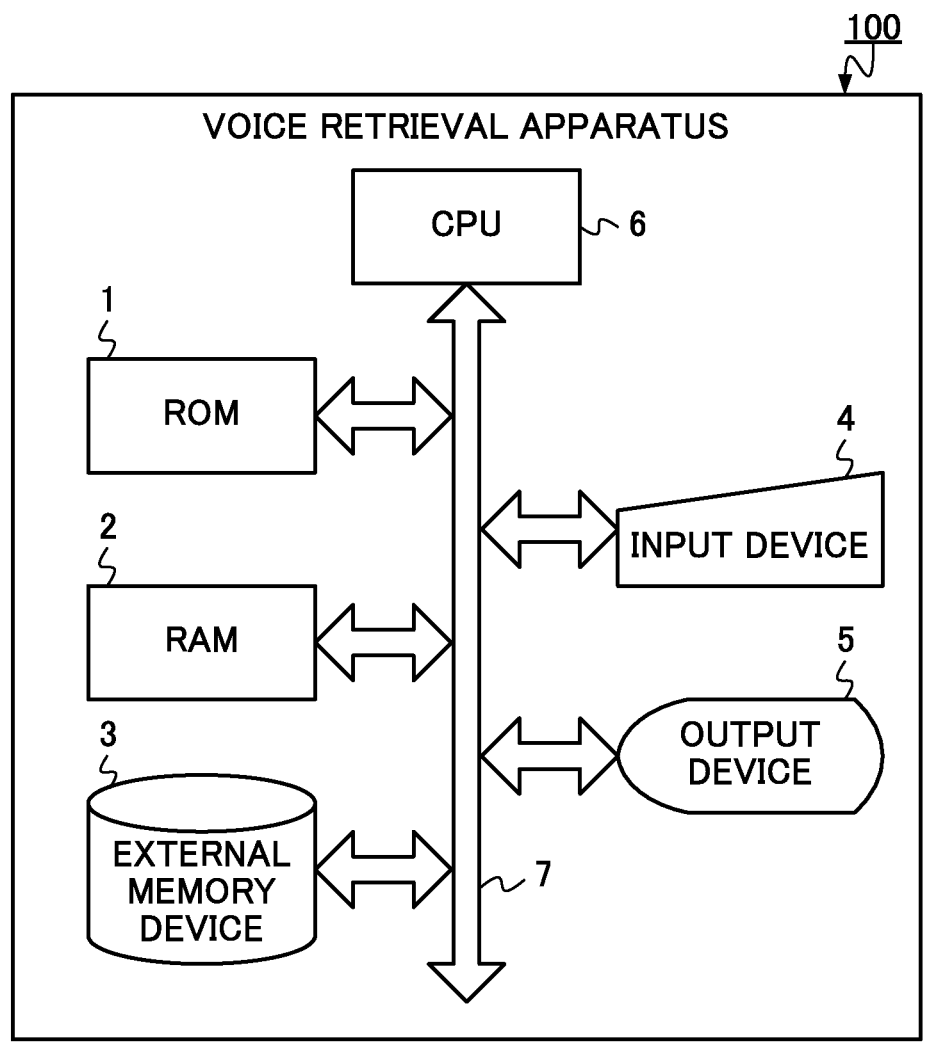
FIG. 1 is a diagram illustrating a physical structure of a voice retrieval apparatus according to a first embodiment of the present disclosure.

An explanation will be given of a voice retrieval apparatus according to embodiments of the present disclosure with reference to the figures. The same or equivalent part throughout the figures will be denoted by the same reference numeral.

First Embodiment

A voice retrieval apparatus 100 according to a first embodiment includes, as illustrated in FIG. 1, as a physical structure, a Read-Only Memory (ROM) 1, a Random Access Memory (RAM) 2, an external memory device 3, an input device 4, an output device 5, a Central Processing Unit (CPU) 6, and a bus 7.

The ROM 1 stores a voice retrieval program. The RAM 2 is utilized as a work area for the CPU 6.

The external memory device 3 includes, for example, a hard disk, and stores data on a sound signal subjected to analysis (hereinafter, referred to as a retrieval sound signal), a mono-phone model, a tri-phone model, and a phoneme time length to be explained later.

The input device 4 includes, for example, a keyboard and a voice recognition device. The input device 4 supplies, to the CPU 6, text data that is a retrieval term input by a user. The output device 5 includes, for example, a screen like a liquid crystal display, a speaker, and the like. The output device 5 displays, on the screen, the text data output by the CPU 6, and outputs, from the speaker, voice data.

The CPU 6 reads the voice retrieval program stored in the ROM 1 and to the RAM 2, and executes the voice retrieval program, thereby accomplishing the functions to be explained later. The bus 7 connects the ROM 1, the RAM 2, the external memory device 3, the input device 4, the output device 5, and the CPU 6 one another.

Figure 2:
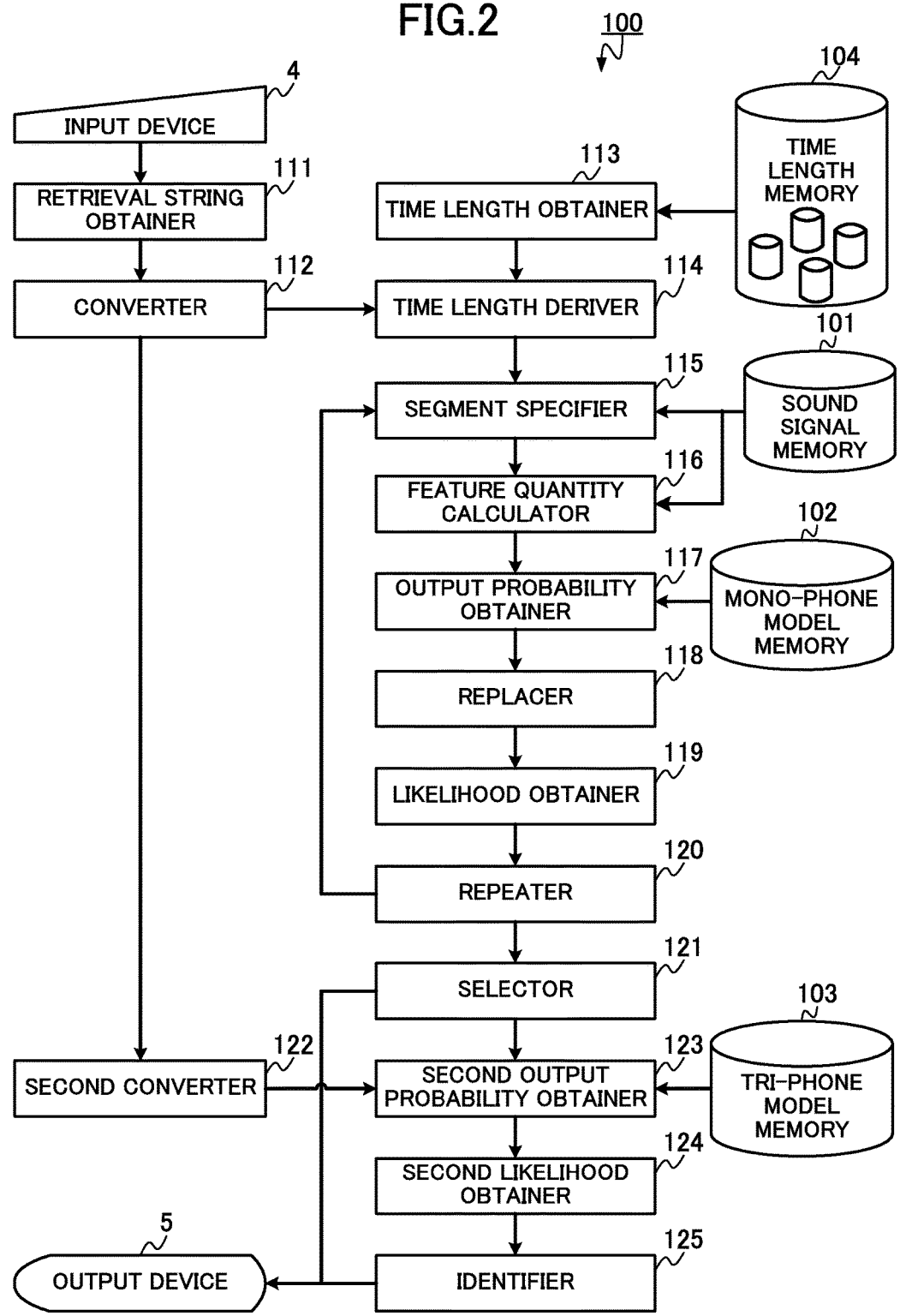
FIG. 2 is a diagram illustrating a functional structure of the voice retrieval apparatus according to the first embodiment of the present disclosure.

The voice retrieval apparatus 100 includes, as a functional structure, as illustrated in FIG. 2, a sound signal memory 101, a mono-phone model memory 102, a tri-phone model memory 103, a time length memory 104, a retrieval string obtainer 111, a converter 112, a time length obtainer 113, a time length deriver 114, a segment specifier 115, a feature quantity calculator 116, an output probability obtainer 117, a replacer 118, a likelihood obtainer 119, a repeater 120, a selector 121, a second converter 122, a second output probability obtainer 123, a second likelihood obtainer 124, and an identifier 125. The sound signal memory 101, the mono-phone model memory 102, the tri-phone model memory 103, and the time length memory 104 are constructed in the memory area of the external memory device 3.

The sound signal memory 101 stores the retrieval sound signal. Example retrieval sound signals are sound like news broadcasting, recorded sound of meeting, recorded sound of lecture meeting, and movie sound.

The mono-phone model memory 102 and the tri-phone model memory 103 store respective acoustic models. The acoustic model is modeled frequency characteristics of each phoneme that constructs a character string that is obtainable as a retrieval string. More specifically, the mono-phone model memory 102 stores an acoustic model (mono-phone model) on the basis of a mono-phone (a phoneme), and the tri-phone model memory 103 stores an acoustic model (tri-phone model) on the basis of tri-phones (3 phonemes).

The term phoneme is a unit of component that constructs voices uttered by a person who utters a term. For example, a term "category" contains 8 phonemes that are "k", "a", "t", "e", "g", "o", "r", and "i".

The mono-phone model is an acoustic model created for each phoneme, and is an acoustic model that does not depend on adjacent phonemes, that is, an acoustic model which has a fixed state transition relative to previous and subsequent phonemes. The tri-phone model is an acoustic model created for each 3 phonemes, and is an acoustic model that depends on adjacent phonemes, that is, an acoustic model that has the state transition taken into consideration relative to the previous and subsequent phonemes. The tri-phone model contains a larger amount of information than that of the mono-phone model. The voice retrieval apparatus 100 learns the mono-phone model and the tri-phone model through a general scheme, and stores the mono-phone model and the tri-phone model in the mono-phone model memory 102 and the tri-phone model memory 103, respectively, and beforehand.

An example acoustic model applicable as the mono-phone model and the tri-phone model is, for example, a Hidden Markov Model (HMM) that is utilized in general voice recognition technologies. The HMM is a model to stochastically estimate, from a sound signal, phonemes that construct such a sound signal by a statistical scheme. Utilized as for the HMM is a standard pattern that has parameters which are a transition probability showing a fluctuation of a state in a time, and a probability (output probability) that a feature quantity which is input in each state is output.

Figure 3:
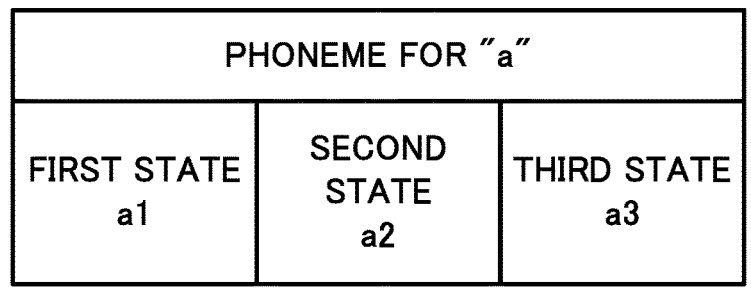
FIG. 3 is a diagram to explain a phoneme state.

The time length memory 104 stores, in a unit of each phoneme state, a continuous time length of each phoneme utilized in the acoustic model in a manner classified into groups, such as for each utterance rate, for each gender, for each age group, and for each utterance environment. The continuous time length of each phoneme is an average time length when each phoneme is uttered. The state of each phoneme is a unit obtained by subdividing each phoneme in a direction of time, and is equivalent to the minimum unit of the acoustic model. Each phoneme has a number of states defined beforehand. An explanation will be given of an example case in which the number of states defined for each phoneme is "3". For example, a Japanese voice "a" contains a phoneme "a" that has three states as illustrated in FIG. 3 which are a first state "a1" including a start of utterance of this phoneme, a second state "a2" that is an intermediate state, and a third state "a3" including an end of utterance of this phoneme. That is, a phoneme is constructed by three states. When the number of all phonemes utilized in the acoustic model is Q, there are (3×Q) number of states. The voice retrieval apparatus 100 calculates, for each phoneme state, an average value of the continuous time length based on a large quantity of data on sound signals, and stores a calculation result in the time length memory 104 beforehand.

In this embodiment, the groups of phoneme continuous time length is classified into groups corresponding to five types of utterance rate which are "fast", "slightly fast", "normal", "slightly slow", and "slow". The time length memory 104 classifies a large amount of sound data into groups of five types of utterance rate that are "fast", "slightly fast", "normal", "slightly slow", and "slow", obtains an average phoneme continuous time length for each utterance rate group, and stores the continuous time length for each group corresponding to the utterance rate.

The retrieval string obtainer 111 obtains a retrieval string input by the user via the input device 4. That is, the user gives, to the voice retrieval apparatus 100, a character string (text) that is a retrieval term (query) to retrieve a portion of the retrieval sound signal where target voices are uttered.

The converter 112 arranges, in sequence, the phonemes of the mono-phone model that does not depend on the adjacent phonemes in accordance with the retrieval string obtained by the retrieval string obtainer 111, and converts the retrieval string into a phoneme string. That is, the converter 112 arranges the phonemes (mono-phones) in sequence when each character is uttered in the same sequence as the characters contained in the retrieval string, thereby converting the retrieval string into a mono-phone phoneme string.

In this embodiment, an explanation will be given of an example case in which a Japanese term "category" is to be retrieved. When, as the retrieval string, a Japanese term "category" is input, such a term "category" contains 8 phonemes (mono-phones) that are "k", "a", "t", "e", "g", "o", "r", and "i", and thus the converter 112 creates a phoneme string that is "k, a, t, e, g, o, r, i".

The time length obtainer 113 obtains, from the time length memory 104, the average continuous time length for each phoneme state corresponding to five types of utterance rate. The time length deriver 114 obtains, from the time length obtainer 113, the continuous time length for each phoneme state contained in the phoneme string output by the converter 112. Next, based on the obtained continuous time length, a time length of voices (hereinafter, referred to as an utterance time length) corresponding to the retrieval string is derived.

More specifically, first, the time length deriver 114 obtains, from the group of phoneme continuous time lengths for "fast", the continuous time lengths corresponding to eight phonemes that are "k, a, t, e, g, o, r, i". More specifically, since each phoneme has three states, and data on the continuous time length is accumulated for each state, 24 pieces of data on continuous time length are obtained. Next, the obtained continuous time lengths are added together, thereby deriving an utterance time length for the "fast" utterance rate for the phoneme string "k, a, t, e, g, o, r, i". Subsequently, 24 pieces of data on continuous time length are likewise obtained from the group of phoneme continuous time lengths for "slightly fast", and the utterance time length for the "slightly fast" utterance rate is derived. Likewise, 24 pieces of data on continuous time length are obtained from each of the group of phoneme continuous time lengths for "normal", the group of phoneme continuous time lengths for "slightly slow", and the group of phoneme continuous time lengths for "slow", and thus respective utterance time lengths are derived.

This will be explained in more detail with reference to FIG. 4. The first row in FIG. 4 shows the 24 states of eight phonemes of a retrieval term which are "category". The second row shows a value when the continuous time length corresponding to each phoneme state is obtained from the group of continuous time lengths for the "fast" utterance rate in the time length memory 104. In addition, a value (515 ms) obtained by totalizing 24 continuous time lengths is the utterance time length for the "fast" utterance rate. The third row shows a value when the continuous time length corresponding to each phoneme state is obtained from the group of continuous time lengths for the "slightly fast" utterance rate in the time length memory 104. In addition, a value (635 ms) obtained by totalizing 24 continuous time lengths is the utterance time length for the "slightly fast" utterance rate. Likewise, the utterance time length (755 ms) for the "normal" utterance rate, the utterance time length (875 ms) for the "slightly slow" utterance rate, and the utterance time length (995 ms) for the "slow" utterance rate are obtained.

That is, the voice retrieval apparatus 100 prepares, in the time length memory 104 beforehand, typical five types of continuous time length at the time of utterance for each phoneme state, and derives five types of utterance time length corresponding to the retrieval term.

Returning to FIG. 2, the segment specifier 115 obtains the retrieval sound signal from the sound signal memory 101, and specifies, from the header of the retrieval sound signal in sequence, the segment of the utterance time length derived by the time length deriver 114 as a likelihood obtainment segment. The term likelihood is an indicator that shows a similarity level between voices subjected to retrieval and the phoneme string corresponding to the retrieval string created from the acoustic model. In order to compare the phoneme string converted from the retrieval string with the sound signal, the segment specifier 115 takes out the sound signal portion within the specified likelihood obtainment segment, and divides the taken-out signal portion into frames corresponding to each phoneme state contained in the phoneme string. The segment specifier 115 associates, for each of five time lengths derived by the time length deriver 114, each frame contained in the taken-out sound signal portion with each phoneme state contained in the phoneme string.

Figure 5A:
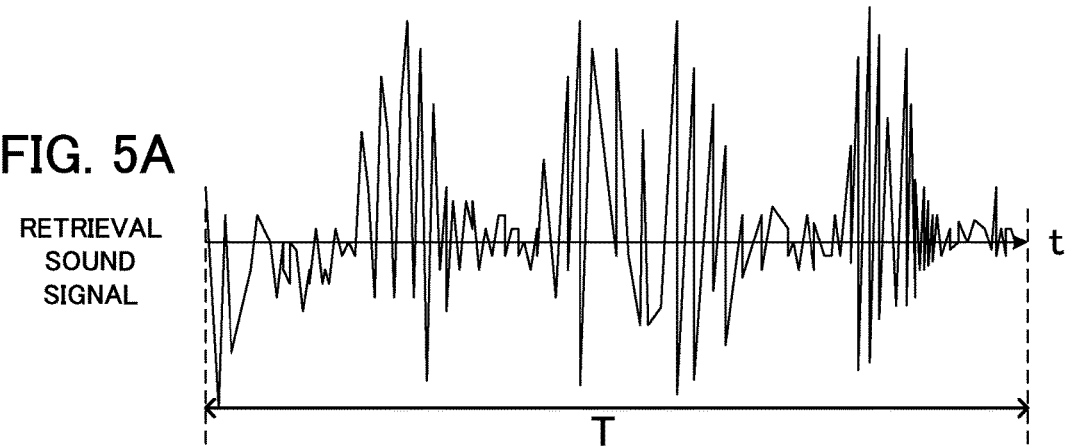
FIG. 5A is a waveform diagram of a sound signal subjected to retrieval.
Figure 5B:
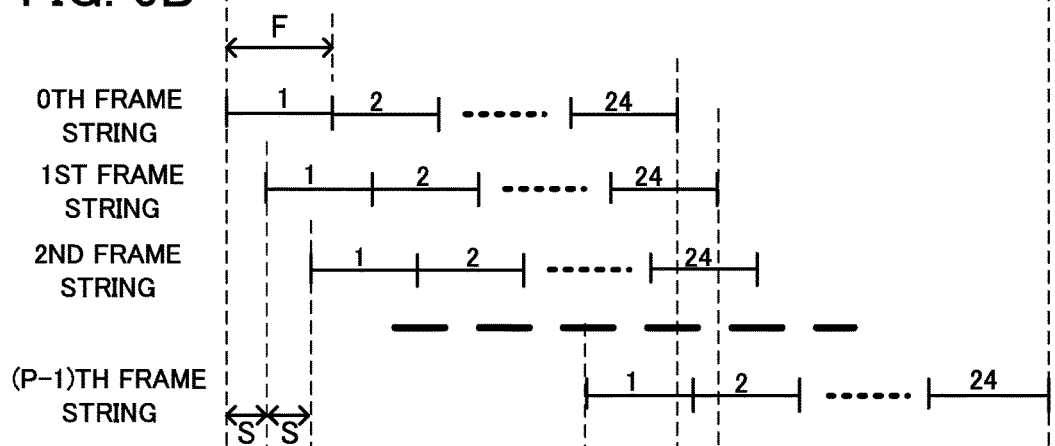
FIG. 5B is a diagram illustrating a frame set in the sound signal subjected to retrieval.

The term frame is a time window that has a time length corresponding to a phoneme state. More specifically, the frame that is set in the retrieval sound signal will be explained with reference to FIGS. 5A, 5B and 5C. FIG. 5A is a waveform diagram of retrieval sound signal with a time length T from the header to the last. The vertical axis represents an amplitude of waveform, while the horizontal axis represents a time t. FIG. 5B illustrates a frame that is set in the sound signal illustrated in FIG. 5A. The first line indicates a 0th frame string beginning from the header of the sound signal. Since the number of phonemes contained in the Japanese term "category" is eight and there are 24 phoneme states, the number of frames contained in the 0th frame string is 24. Since the phoneme continuous time length varies depending on the utterance rate, a frame length F also varies depending on the utterance rate. Hence, five frame strings corresponding to five types of utterance rate that are "fast", "slightly fast", "normal", "slightly slow", and "slow" are set in the 0th frame string beginning from the header of the sound signal. A first frame string in the second line is set so as to be shifted from the header of the sound signal by a predetermined shift length S. The first frame string also has 24 frames, and five frame strings are set in accordance with the types of utterance rate. Subsequently, the header position of the frame string is likewise shifted by the shift length S, and setting of five frame strings is made up to a (P−1)th frame string.

The shift length S is a length to define the precision of a retrieval position to retrieve at which position in the sound signal the retrieval term is present. The shift length S is set to a fixed and shorter value than the shortest frame length. In this embodiment, since shortest length of a phoneme state shown in FIG. 4 is 15 ms, the shift length S is set to be 5 ms shorter than that length.

Figure 5C:
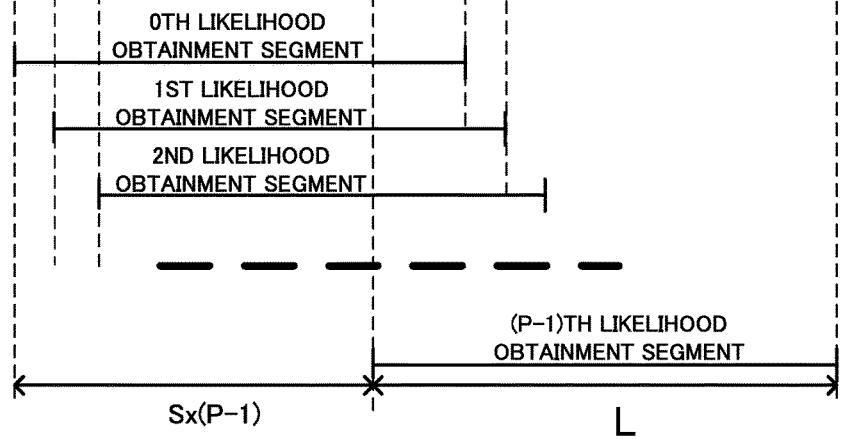
FIG. 5C is a diagram illustrating a likelihood obtainment segment specified in the sound signal subjected to retrieval.

FIG. 5C illustrates a likelihood obtainment segment specified by the segment specifier 115 in the retrieval sound signal. First of all, the segment specifier 115 specifies the segment of the 0th frame string containing the 24 frames and beginning from the header of the sound signal as a 0th likelihood obtainment segment with a time length L. Since there are five 0th frame strings corresponding to the types of utterance rate, five 0th likelihood obtainment segments are specified in accordance with the types of utterance rate. Next, the segment of the first frame beginning from the position shifted by the shift length S from the header of the sound signal is specified as a first likelihood obtainment segment. Five first likelihood obtainment segments are likewise specified. Likewise, likelihood obtainment segment up to the (P−1)th likelihood obtainment segment corresponding to the (P−1)th frame string is specified five by five in sequence.

Returning to FIG. 2, the feature quantity calculator 116 calculates, for each frame, the feature quantity of the retrieval sound signal within the likelihood obtainment segment specified by the segment specifier 115. The feature quantity is obtainable by combining a frequency-axis-system feature parameter obtained by converting sound data on the frequency axis with a power-system parameter obtained by calculating a square sum of the energy of sound data and a logarithm thereof.

For example, as is conventionally well-known, the feature quantity comprises a 38-dimensional vector quantity with a total of 38 components: 12 components of the frequency-axis-system feature parameter (12 dimensions) and 1 component of the power-system feature parameter (1 dimension); a difference between each component of the present window and the previous time window, that is, 12 components of the Δ frequency-axis-system feature parameter (12 dimensions) and 1 component of the Δ power-system feature parameter (1 dimension); and a difference between a difference of each component of the present time window and the previous time window, that is, 12 components of the ΔΔ frequency-axis-coordinate feature parameter.

Returning to FIG. 2, the output probability obtainer 117 obtains, for each frame, a probability (output probability) that the feature quantity is output from each phoneme contained in the phoneme string based on the feature quantity calculated by the feature quantity calculator 116. More specifically, the output probability obtainer 117 obtains, from the mono-phone model memory 102, the mono-phone model, and compares the feature quantity in each frame calculated by the feature quantity calculator 116 with the mono-phone model in the corresponding state to this frame in the phoneme states contained in the phoneme string. Next, the probability that the feature quantity in each frame is output from the corresponding state is calculated.

The output probability obtainer 117 calculates, for each of five likelihood obtainment segments corresponding to the utterance rate and specified by the segment specifier 115, the output probability for each of 24 frames contained in each likelihood obtainment segment.

The replacer 118 replaces each output probability obtained by the output probability obtainer 117 with the maximum output probability in the adjacent several previous and subsequent frames. This replacement process is called Lower-Bounding. This process is also performed for each of five likelihood obtainment segments.

Figure 6:
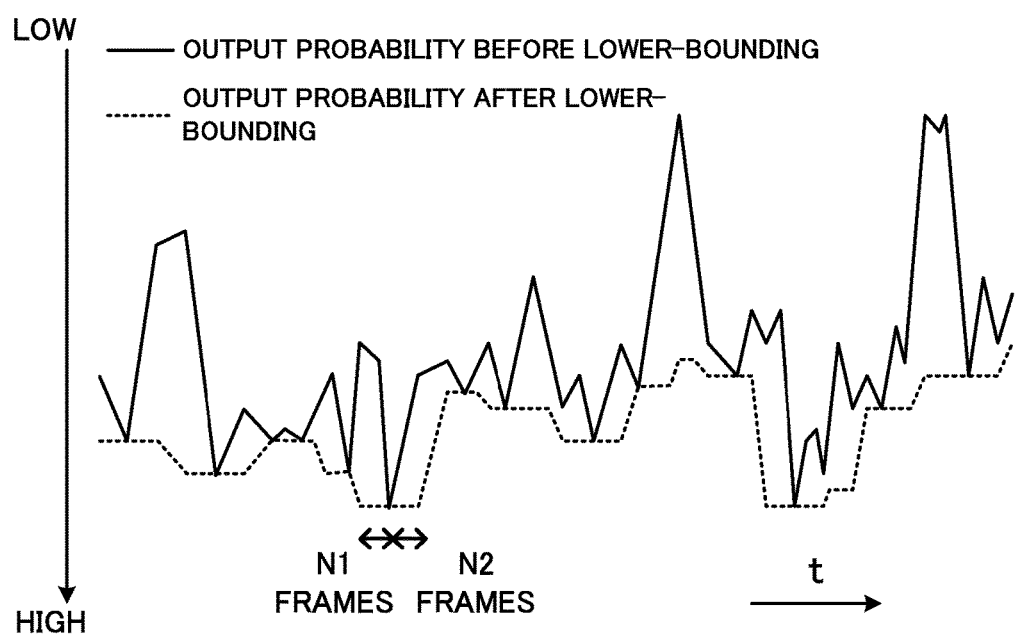
FIG. 6 is a diagram illustrating an example way of performing Lower-Bounding on an output probability.

More specifically, with reference to FIG. 6, the Lower-Bounding will be explained. In FIG. 6, a continuous line indicates an output probability obtained for each frame. The vertical axis indicates the height of the output probability so as to increase toward the bottom, and the horizontal axis indicates a time t. The replacer 118 replaces the output probability of each frame with the maximum output probability in this frame, N1 number of previous frames, and N2 number of subsequent frames. N1 and N2 are both natural numbers including zero, but either N1 or N2 is not zero. An explanation will be given of a case in which N1=N2=2. The output probability of the first frame in the frame string is replaced with the maximum output probability in the first frame, the subsequent second and third frames since there is no frame previous to the first frame. The output probability of the second frame is replaced with the maximum output probability in the previous first frame, the second frame, and subsequent third and fourth frames. The output probability of the third frame is replaced with the maximum output probability in the previous first and second frames, the third frame, and the subsequent fourth and fifth frames. In this way, the replacement process is performed up to the 24th frame. Upon replacement, the output probability indicated by the continuous line is converted to an output probability that has a small change in value along a time direction like an LB (Lower-Bounding) output probability indicated by a dashed line.

By such Lower-Bounding, an error between the continuous time length of each phoneme stored in the time length memory 104 and the actual continuous time length of sound signal, and an error between the utterance time length of voices corresponding to the retrieval string derived by the time length deriver 114 and the actual utterance time length of sound signal are reduced within previous and subsequent several frames.

The likelihood obtainer 119 obtains a likelihood that shows a plausibility of the likelihood obtainment segment specified by the segment specifier 115 where voices corresponding to the retrieval string are uttered based on the output probability having undergone the replacement process by the replacer 118. More specifically, the likelihood obtainer 119 adds the values obtained by getting a logarithm of each output probability having undergone the replacement process across all frames from the header of the likelihood obtainment segment to the last, in this example, the 24 frames to obtain the likelihood of this likelihood obtainment segment. That is, the more the likelihood obtainment segment contains frames with a high output probability, the larger the likelihood to be obtained by the likelihood obtainer 119 becomes. This process is also performed for each of five likelihood obtainment segments corresponding to the types of utterance rate.

Note that this is a process of multiplying the output probabilities of the respective frames, and thus the output probabilities may be directly multiplied without getting a logarithm, or an approximation formula may be applied instead of the logarithm.

The repeater 120 controls the respective components so as to change the specified segment in the sound signal portion in the likelihood obtainment segment specified by the segment specifier 115, and to cause the segment specifier 115, the feature quantity calculator 116, the output probability obtainer 117, the replacer 118, and the likelihood obtainer 119 to repeat respective processes.

More specifically, with reference to FIGS. 5B and 5C, under the control of the repeater 120, the segment specifier 115 shifts the header position of the frame by the shift length S (=10 ms) to specify the first frame string, and newly specifies the segment of the first frame string as a first likelihood obtainment segment. Five first likelihood obtainment segments are specified corresponding to the types of utterance rate. Next, the repeater 120 causes the respective components to repeat the processes of the respective components from the feature quantity calculator 116 to the likelihood obtainer 119 in this newly specified first likelihood obtainment segment, thereby obtaining the likelihood of the first likelihood obtainment segment.

Likewise, the repeater 120 causes the segment specifier 115 to shift the specifying likelihood obtainment segment by the shift length S (=10 ms) from the second likelihood obtainment segment to the (P−1)th likelihood obtainment segment, thereby controlling the respective components to obtain the likelihood in each likelihood obtainment segment having undergone the shifting. Consequently, for each likelihood obtainment segment obtained by shifting the retrieval sound signal by the shift length S, the likelihood for the phoneme string "k, a, t, e, g, o, r, i" created based on the mono-phone model is obtained.

Note that a number P of the likelihood obtainment segments specifiable in the retrieval sound signal is defined as P=(T−L+S)/S where T is the time length of the sound signal, L is the time length of the likelihood obtainment segment, and S is the shift length. Since five likelihood obtainment segments are set for each type of utterance rate, the likelihood is obtained for each of a total of 5P number of likelihood obtainment segments.

The selector 121 selects, in the order of higher likelihood, x number of candidate estimate segments where the utterance of voice corresponding to the retrieval string is estimated in the likelihood obtainment segments specified by the segment specifier 115 based on the likelihood obtained by the likelihood obtainer 119. That is, in order to reduce the calculation amount for a further precise likelihood obtainment based on the tri-phone model at a later stage, the selector 121 preliminary selects x number of segments that will be candidates of a final retrieval result from the 5P number of likelihood obtainment segments from which the respective likelihoods have been obtained, and excludes the remaining likelihood obtainment segments from the candidates.

At this time, since the likelihood obtainment segments specified by the segment specifier 115 have a large number of overlap portions, the segments where the likelihood is high often present in sequence in time series. Hence, when the selector 121 simply selects, in the order of higher likelihood, the candidate estimation segments among the likelihood obtainment segments, a possibility that the segments to be selected are concentrated at a portion of the retrieval sound signal increases.

In order to avoid this occasion, the selector 121 sets a predetermined selection time length, and for each selection time length, the likelihood obtainment segment with the maximum likelihood is selected one by one among the likelihood obtainment segments beginning within the predetermined selection time length. The predetermined selection time length is set to be shorter than the time length L of the likelihood obtainment segment like a time length corresponding to 1/m (for example, ½) of the time length L of the likelihood obtainment segment. When, for example, the utterance time length of the Japanese term "category" is assumed as being equal to or longer than 2 seconds (L≥2 seconds), the value m is set to be m=2, and the selection time length is set to be 1 second. The likelihood obtainment segment is selected one by one as a candidate for each selection time length (L/m), and the others are excluded from the candidates. Hence, the selector 121 is capable of sufficiently selecting the candidate estimation segments across the whole retrieval sound signal.

The selector 121 selects x number of likelihood obtainment segments with a high likelihood among the likelihood obtainment segments selected for each selection time length (L/m). This selection is performed for each of the likelihood obtainment segments corresponding to the five types of utterance rate. That is, for each of five types of utterance rate, x number (a total of 5×) of likelihood obtainment segments with a high likelihood are selected among the likelihood obtainment segments selected for each of the five types of utterance rate.

Next, in order to further limit the segments to be the candidates, the selector 121 compares the likelihood of the likelihood obtainment segments among the five types of utterance rate, selects only the x number of likelihood obtainment segments corresponding to the utterance rate that has a high likelihood as final candidates, and excludes the remaining likelihood obtainment segments from the candidates.

An explanation will be given of an example case in which the number x for selection is 10 (x=10) with reference to FIG. 7. The utterance time length for the Japanese term "category" is assumed as being equal to or longer than 2 seconds, and the selection time length is set to 1 second. First, the selector 121 selects, one by one, the likelihood obtainment segment with the highest likelihood for each selection time length (1 second) among the P number of likelihood obtainment segments corresponding to the "fast" utterance rate. Next, 10 likelihood obtainment segments in the order of higher likelihood are selected from the likelihood obtainment segments selected for each 1 second, and the selected likelihood obtainment segments are stored in the likelihood field for the "fast" utterance rate in FIG. 7. Next, the selector 121 totalizes the 10 likelihoods (0.93). Subsequently, the selector 121 selects, one by one, the likelihood obtainment segment with the highest likelihood for each selection time length (1 second) among the P number of likelihood obtainment segments corresponding to the "slightly fast" utterance rate. Next, 10 likelihood obtainment segments in the order of higher likelihood are selected from the likelihood obtainment segments selected for each 1 second, and the selected likelihood obtainment segments are stored in the likelihood field for the "slightly fast" utterance rate in FIG. 7. Next, the selector 121 totalizes the 10 likelihoods (1.39). Likewise, the total value corresponding to the "normal" utterance rate is (2.12), the total value corresponding to the "slightly slow" utterance rate is (2.51), and the total value corresponding to the "slow" utterance rate is (1.33).

Next, the selector 121 compares the respective total values one another, and selects, as the final candidates, only the 10 likelihood obtainment segments corresponding to "slightly slow" and having the largest total value (2.51).

A selection result by the selector 121 is displayed to the exterior via the screen of the output device 5. Next, the voice retrieval apparatus 100 executes a likelihood obtaining process with a higher precision on the x number of selected segments based on the tri-phone model and a Dynamic Programming (DP) matching technique. The DP matching is a scheme of selecting a state transition so as to maximize the likelihood in the analysis segment. As for the tri-phone model, the state transition relative to previous and subsequent phonemes needs to be taken into consideration. Hence, the state transition relative to previous and subsequent phonemes is determined in such a way that the likelihood of the likelihood obtainment segment is maximized by DP matching.

The second converter 122 arranges the phonemes of the tri-phone model that is the second acoustic model depending on adjacent phonemes in sequence in accordance with the retrieval string obtained by the retrieval string obtainer 111, thereby converting the retrieval string into a tri-phone phoneme string that is a second phoneme string. When, for example, the Japanese term "category" is input as the retrieval string, the term "category" contains six tri-phones that are "k−a+t", "a−t+e", "t−e+g", "e−g+o", "g−o+r", and "o−r+i". Thus, the second converter 122 creates a tri-phone phoneme string containing such six tri-phones arranged in sequence. In addition, bi-phones "k+a" and "r−i" each containing two phonemes may be allocated to the beginning and the last. In this case, the bi-phone model may be stored in the external memory device 3 beforehand. Note that a phoneme located at the left side of the symbol "−" is located prior to a center phoneme, and a phoneme located at the right side of the symbol "+" is located subsequent to the center phoneme.

The second output probability obtainer 123 obtains, for each frame, the output probability that the feature quantity of retrieval sound signal in the 10 likelihood obtainment segments corresponding to the "slightly slow" utterance rate and selected as the candidate estimation segments by the selector 121 is output from each phoneme contained in the second phoneme string (tri-phone phoneme string) converted by the second converter 122. More specifically, the second output probability obtainer 123 obtains, from the tri-phone model memory 103, the tri-phone model, and compares the feature quantity in each frame calculated by the feature quantity calculator 116 with each tri-phone model contained in the tri-phone phoneme string. Next, the output probability that the feature quantity is output from each tri-phone in each frame is calculated.

The second likelihood obtainer 124 obtains, for each of the candidate segments limited by the selector 121 into the x number (10 segments), a second likelihood showing the plausibility that the selected 10 likelihood obtainment segments for the "slightly slow" utterance rate as the candidate estimation segment by the selector 121 are the segments where voices corresponding to the retrieval string are uttered. The second likelihood is obtained based on the tri-phone phoneme string that is the second phoneme string. Accordingly, the second likelihood is an indicator with a higher precision than the likelihood obtained by the likelihood obtainer 119 based on the mono-phone phoneme string.

The second likelihood obtainer 124 retrieves, for each frame contained in the second likelihood obtainment segment limited by the selector 121, an association between the feature quantity of the sound signal and each tri-phone model contained in the tri-phone phoneme string by DP matching based on the output probability obtained by the second output probability obtainer 123. Next, by adding values obtained by taking a logarithm of the output probability obtained for each frame in the likelihood obtainment segment selected by the selector 121, the second likelihood in this segment is obtained.

The identifier 125 identifies, among the 10 candidate segments for the "slightly slow" utterance rate selected by the selector 121, the estimation segment where the utterance of voices corresponding to the retrieval string is estimated in the retrieval sound signal based on the second likelihood obtained by the second likelihood obtainer 124. For example, the identifier 125 identifies, as the estimation segments, a predetermined number of segments in the order of larger second likelihood obtained by the second likelihood obtainer 124. Alternatively, the identifier 125 identifies, as the estimation segment, the segment that has the likelihood equal to or larger than a predetermined value. The positional information on the segment identified by the identifier 125 is displayed to the exterior via the screen of the output device 5 as a final retrieval result.

An explanation will be given of a voice retrieval process executed by the voice retrieval apparatus 100 employing the above physical structure and functional structure with reference to the flowchart of FIG. 8.

The user obtains, from a large amount of voice data corresponding to five types of utterance rate that are "fast", "slightly fast", "normal", "slightly slow", and "slow", the continuous time length of each phoneme state corresponding to each type of utterance rate beforehand, and stores the obtained continuous time length in the time length memory 104. The sound signal subjected to analysis is, for example, recorded sound of 1-hour lecture meeting, and is stored in the sound signal memory 101. In this case, the query subjected to retrieval is "category".

Figure 8:
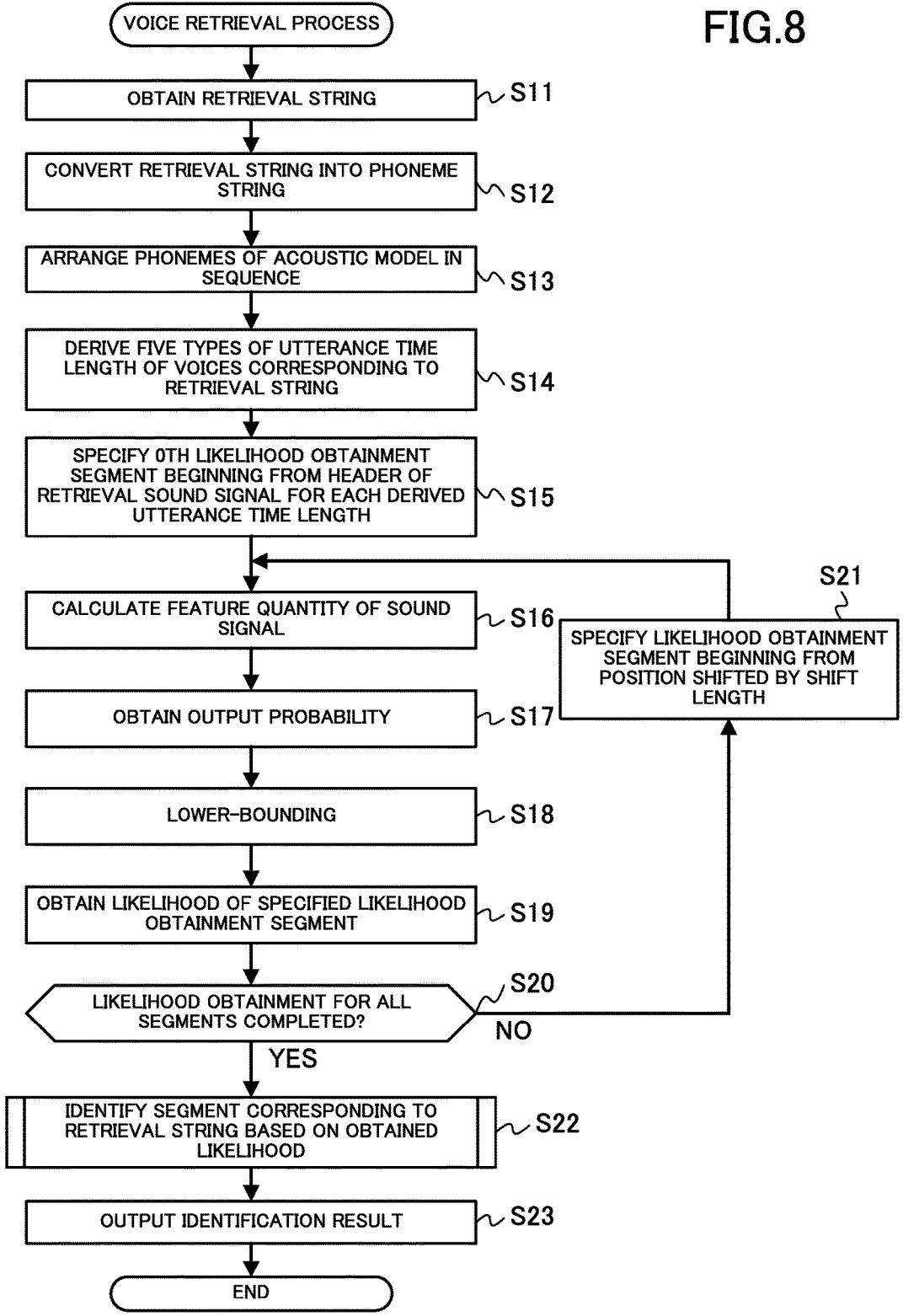
FIG. 8 is a flowchart illustrating a flow of a voice retrieval process executed by the voice retrieval apparatus according to the first embodiment of the present disclosure.

When the CPU 6 reads the voice retrieval program from the ROM 1, and executes this program, the flowchart of FIG. 8 starts. The user inputs the query "category" subjected to retrieval from the input device 4, and the retrieval string obtainer 111 obtains the retrieval string (step S11). When the retrieval string obtainer 111 obtains the retrieval string, the converter 112 and the second converter 122 convert the retrieval string into the respective phoneme strings (step S12), and arrange the phonemes of the respective acoustic models in sequence in the order of the phoneme in the phoneme string (step S13). More specifically, the converter 112 converts the retrieval string into a mono-phone phoneme string "k, a, t, e, g, o, r, i" based on the mono-phone model, while the second converter 122 converts the retrieval string into tri-phone strings "k−a+t", "a−t+e", "t−e+g", "e−g+o", "g−o+r", and "o−r+i" based on the tri-phone model. In this case, bi-phone models "k+a" and "r−i" may be added.

When the retrieval string is converted into the phoneme string, the time length deriver 114 derives the utterance time length of voices corresponding to the retrieval string (step S14). More specifically, the time length deriver 114 adds the continuous time lengths together which are stored for respective phoneme states in the time length memory 104, thereby deriving the utterance time length of voices corresponding to the retrieval string. The time length memory 104 stores the five groups of phoneme continuous time length that are "fast", "slightly fast", "normal", "slightly slow", and "slow". Hence, the time length deriver 114 derives the time length for each of the groups of phoneme continuous time length, and thus five types of time length are derived as the utterance time lengths.

More specifically, as explained above with reference to FIG. 4, the time length deriver 114 derives, as the utterance time lengths of the retrieval term "category", the utterance time length (515 ms) for the "fast" utterance rate, the utterance time length (635 ms) for the "slightly fast" utterance rate, the utterance time length (755 ms) for the "normal" utterance rate, the utterance time length (875 ms) for the "slightly slow" utterance rate, and the utterance time length (995 ms) for the "slow" utterance rate.

Returning to FIG. 8, when the time length deriver 114 derives the five time lengths, the segment specifier 115 specifies the 0th frame string beginning from the header position of the frame string (step S15). First of all, the 0th frame string that has the frame length which is the continuous time lengths of the 24 states from "k1" to "i3" for the "fast" utterance rate shown in the second row of FIG. 4 is specified for the "fast" utterance rate. Next, the segment (from 0 ms to 515 ms) from the header of the sound signal is specified as the 0th likelihood obtainment segment for the "fast" utterance rate. Subsequently, the 0th frame string that has the frame length which is the continuous time lengths of the 24 states from "k1" to "i3" for the "slightly fast" utterance rate shown in the third row of FIG. 4 is specified for the "slightly fast" utterance rate. Next, the segment (from 0 ms to 635 ms) from the header of the sound signal is specified as the 0th likelihood obtainment segment for the "slightly fast" utterance rate. Likewise, the 0th frame string (from 0 ms to 755 ms) from the header of the sound signal is specified as the 0th likelihood obtainment segment for the "normal" utterance rate, the 0th frame string (from 0 ms to 875 ms) from the header of the sound signal is specified as the 0th likelihood obtainment segment for the "slightly slow" utterance rate, and the 0th frame string (from 0 ms to 995 ms) from the header of the sound signal is specified as the 0th likelihood obtainment segment for the "slow" utterance rate. Although the header position of the five likelihood obtainment segments are common, the end positions become different since the time length is different.

When the segment specifier 115 specifies the likelihood obtainment segment, the feature quantity calculator 116 calculates, for each frame, the feature quantity of the sound signal within the specified likelihood obtainment segment (step S16).

More specifically, first, for the first frame in the 0th frame string for the "fast" utterance rate, the feature quantity with respect to the phoneme "k1" in FIG. 4 is calculated. Next, for the second frame in the 0th frame string, the feature quantity with respect to the phoneme "k2" is calculated. Likewise, up to the 24th frame in the 0th frame string, the feature quantity up to the phoneme "i3" for the "fast" utterance rate is calculated.

When the calculation of the feature quantity of the 0th frame string for the "fast" utterance rate completes, next, the feature quantities by what corresponds to the 24 frames are calculated for the 0th frame string for the "slightly fast" utterance rate. The same is true of the feature quantities calculated by what corresponds to the 24 frames of the 0th frame string for the "normal", "slightly slow", and "slow" utterance rates, respectively.

Subsequently, the output probability obtainer 117 obtains, for each frame, the output probability that the feature quantity is output from each phoneme contained in the phoneme string based on the feature quantity calculated by the feature quantity calculator 116, and the corresponding mono-phone model (step S17). That is, the output probabilities by what corresponds to (five types of utterance rate×P number of frame strings×24 frames) are obtained.

When the output probability obtainer 117 obtains the output probabilities, the replacer 118 replaces the output probability obtained for each frame with the maximum output probability in a total of (1+N1+N2) frames that are the frame, the N1 number of frames previous to this frame, and the N2 number of frames subsequent to this frame, thereby executing the Lower-Bounding process (step S18). Hence, an error between the utterance time length derived by the time length deriver 114 and the actual utterance time length of the sound signal is reduced.

The likelihood obtainer 119 takes a logarithm of each output probability having undergone the Lower-Bounding for each frame, and adds the taken logarithms together, thereby obtaining the likelihood of the likelihood obtainment segment specified by the segment specifier 115 (step S19). The likelihood obtainer 119 performs this process on each of the five likelihood obtainment segments specified by the segment specifier 115. When the likelihood obtainer 119 obtains the likelihood, the repeater 120 determines whether or not likelihood obtainment from all segments in the retrieval sound signal has completed (step S20).

When the likelihood obtainment from all segments has not completed yet (step S20; NO), the segment specifier 115 specifies the likelihood obtainment segment that begins from the position shifted by the shift length S (=10 ms) from the frame specified previously (step S21), and the voice retrieval process returns to the step S16. That is, the segment specifier 115 specifies the beginning position of the first frame string from the position shifted by the shift length S (=10 ms) from the header of the sound signal. Hence, as the first frame string for the "fast" utterance rate, the segment (from 10 ms to 525 ms) from the header of the sound signal is specified, and this segment is specified as the first likelihood obtainment segment corresponding to the "fast" utterance rate. Next, the first frame string corresponding to the "slightly fast" utterance rate is specified, and the segment (from 10 ms to 645 ms) from the header of the sound signal is specified as the first likelihood obtainment segment corresponding to the "slightly fast" utterance rate. Likewise, the first likelihood obtainment segment (from 10 ms to 765 ms) from the header of the sound signal is specified for the "normal" utterance rate, the first likelihood obtainment segment (from 10 ms to 885 ms) from the header of the sound signal is specified for the "slightly slow" utterance rate, and the first likelihood obtainment segment (from 10 ms to 1005 ms) from the header of the sound signal is specified for the "slow" utterance rate.

Next, the repeater 120 controls the respective components so as to repeat the processes in the steps S16 to S20 on the likelihood obtainment segment newly specified by the segment specifier 115 to calculate the feature quantity, to obtain the output probability, and to perform the Lower-Bounding, thereby obtaining the likelihood. As explained above, the repeater 120 controls the segment specifier 115, the feature quantity calculator 116, the output probability obtainer 117, the replacer 118, and the likelihood obtainer 119 so as to shift the likelihood obtainment segment in sequence by the shift length S (=10 ms) until reaching the last of the retrieval sound signal.

Figure 9:
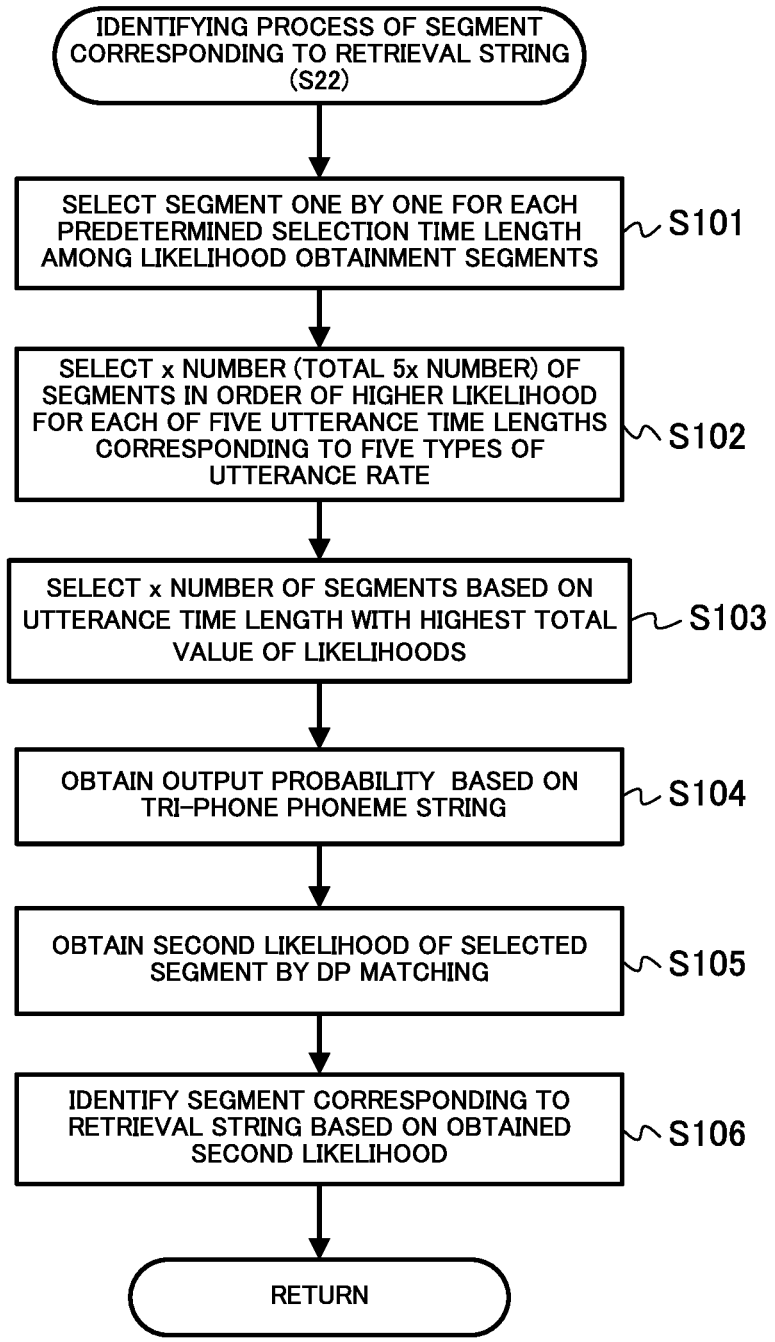
FIG. 9 is a flowchart illustrating a flow of process of identifying a segment corresponding to a retrieval string.

Eventually, when the likelihood obtainment from all segments completes (step S20; YES), the voice retrieval process transitions to a process of identifying the segment corresponding to the retrieval string based on the obtained likelihood (step S22). The details of this identifying process will be explained with reference to the flowchart of FIG. 9.

With the likelihood obtaining process being completed, the selector 121 selects, one by one, the likelihood obtainment segment for each predetermined selection time length (1 second) among the P number of likelihood obtainment segments specified by the segment specifier 115 for each utterance rate (step S101). That is, five likelihood obtainment segments are selected for each 1 second. In addition, the selector 121 selects the x number of likelihood obtainment segments in the order of higher likelihood among the selected segments in this way (step S102). That is, the selector 121 preliminary selects the candidate segments to be identified as the final retrieval result in such a way that candidates are selected across the whole retrieval sound signal.

In order to further limit the number of final candidates, the selector 121 selects only the likelihood obtainment segment corresponding to the utterance rate with the highest likelihood among the five types of utterance rate as the final candidate (step S103). More specifically, for each of the five types of utterance rate, only the x number of likelihood obtainment segments corresponding to the utterance rate that has the largest value obtained by adding the likelihoods corresponding to the x number of selected segments are selected as the final candidates. That is, the 5× number of candidates are limited to the x number of candidates.

As explained above with reference to FIG. 7 when the number x for selection is 10, first, the selector 121 selects 10 likelihood obtainment segments in the order of higher likelihood among the P number of likelihood obtainment segments selected one by one for each selection time length (1 second) and corresponding to the "fast" utterance rate, and totalizes those 10 likelihoods (0.93). Likewise, the total value (1.39) corresponding to the "slightly fast" utterance rate, the total value (2.12) corresponding to the "normal" utterance rate, the total value (2.51) corresponding to the "slightly slow" utterance rate, and the total value (1.33) corresponding to the "slow" utterance rate are respectively obtained. Next, the selector 121 compares the respective total values one another, and selects only 10 likelihood obtainment segments corresponding to "slightly slow" and having the largest total value (2.51) as preliminary selection.

After the preliminary selection by the selector 121, the second output probability obtainer 123 obtains, for each frame based on the tri-phone phoneme string, the output probability in each of the x (10) number of segments selected by the selector 121 (step S104). Next, the second likelihood obtainer 124 obtains the likelihood of the segment selected by the selector 121 by DP matching (step S105). That is, the second output probability obtainer 123 and the second likelihood obtainer 124 execute a likelihood obtaining process with a higher precision than that of the output probability obtainer 117 and the likelihood obtainer 119, based on the tri-phone model and the DP matching.

When the second likelihood obtainer 121 obtains the second likelihood, the identifier 125 identifies the segment corresponding to the retrieval string based on the obtained second likelihood (step S106). For example, the identifier 125 identifies, as the segments where the utterance of voices corresponding to the retrieval string are estimated, the predetermined number of segments in the order of larger second likelihood obtained by the second likelihood obtainer 124. When the process in the step S106 ends, the process in the flowchart of FIG. 9 transitions to step S23 in the flowchart of FIG. 8.

Returning to the flowchart of FIG. 8, after identifying the segment corresponding to the retrieval string, the identifier 125 outputs an identification result via the output device 5 (step S23). Through the above processes, the voice retrieval process executed by the voice retrieval apparatus 100 completes.

As explained above, the voice retrieval apparatus 100 of the first embodiment identifies the segment where the utterance of voices corresponding to the query is estimated in the retrieval sound signal based on the multiple phoneme continuous time lengths corresponding to different utterance rates. Hence, although the utterance rate of retrieval target differs, the voice segment corresponding to the query is identifiable in the retrieval sound signal.

In addition, the voice retrieval apparatus 100 of the first embodiment performs, in the preliminary selection that has a little process load, a process based on a large number of continuous time lengths corresponding to different utterance rates, thereby ensuring a highly precise retrieval. In addition, by limiting the number of candidate segments in the preliminary selection, a process with a heavy process load although the precision is high based on the tri-phone model with a large amount of information is reduced. Consequently, the voice retrieval apparatus 100 is capable of performing a highly precise voice retrieval while reducing a process load.

In the first embodiment, the explanation was given of an example case in which the segment specifier 117 shifts the header position of the frame string by the shift length S, and repeats the processes of calculating the feature quantity, obtaining the output probability, and obtaining the likelihood by P times for every shifting. However, after the segment specifier 117 initially specifies frames from the 0th frame to the (P−1)th frame, and specifies the likelihood obtainment segments from the 0th likelihood obtainment segment to the (P−1)th likelihood obtainment segment, the feature quantity may be calculated and the output probability and the likelihood may be obtained.

In addition, when a bi-phone model is also applied, after the preliminary selection based on the mono-phone model is performed, a secondary selection may be performed based on the bi-phone model, and then a third selection (final selection) based on the tri-phone model may be performed. In addition, in the preliminary selection based on the mono-phone model, a primary selection may be performed based on a combination of the mono-phone model and the bi-phone model, or a secondary selection (final selection) may be performed based on a combination of the bi-phone model and the tri-phone model.

Second Embodiment

Next, an explanation will be given of a second embodiment of the present disclosure.

The voice retrieval apparatus 100 of the first embodiment calculates the output probability applied for likelihood obtainment after the retrieval string obtainer 111 obtains the retrieval string. However, the present disclosure is not limited to this operation. A voice retrieval apparatus of the second embodiment calculates an output probability that has a large amount of calculation beforehand based on the mono-phone model when candidate segments corresponding to the retrieval string are preliminary selected, thereby speeding up a retrieval. That is, output probabilities corresponding to the retrieval term are obtained for all segments in the retrieval sound signal, and are stored as a retrieval index beforehand. Next, at the time of retrieval, the output probability corresponding to the phoneme string of the retrieval term to be input later is obtained from the retrieval index and added to obtain the likelihood of the likelihood obtainment segment, thereby reducing a process load at the time of retrieval. This will be explained in more detail.

A voice retrieval apparatus 300 of the second embodiment employs the same physical structure as that of the voice retrieval apparatus 100 of the first embodiment as illustrated in FIG. 1.

Figure 10:
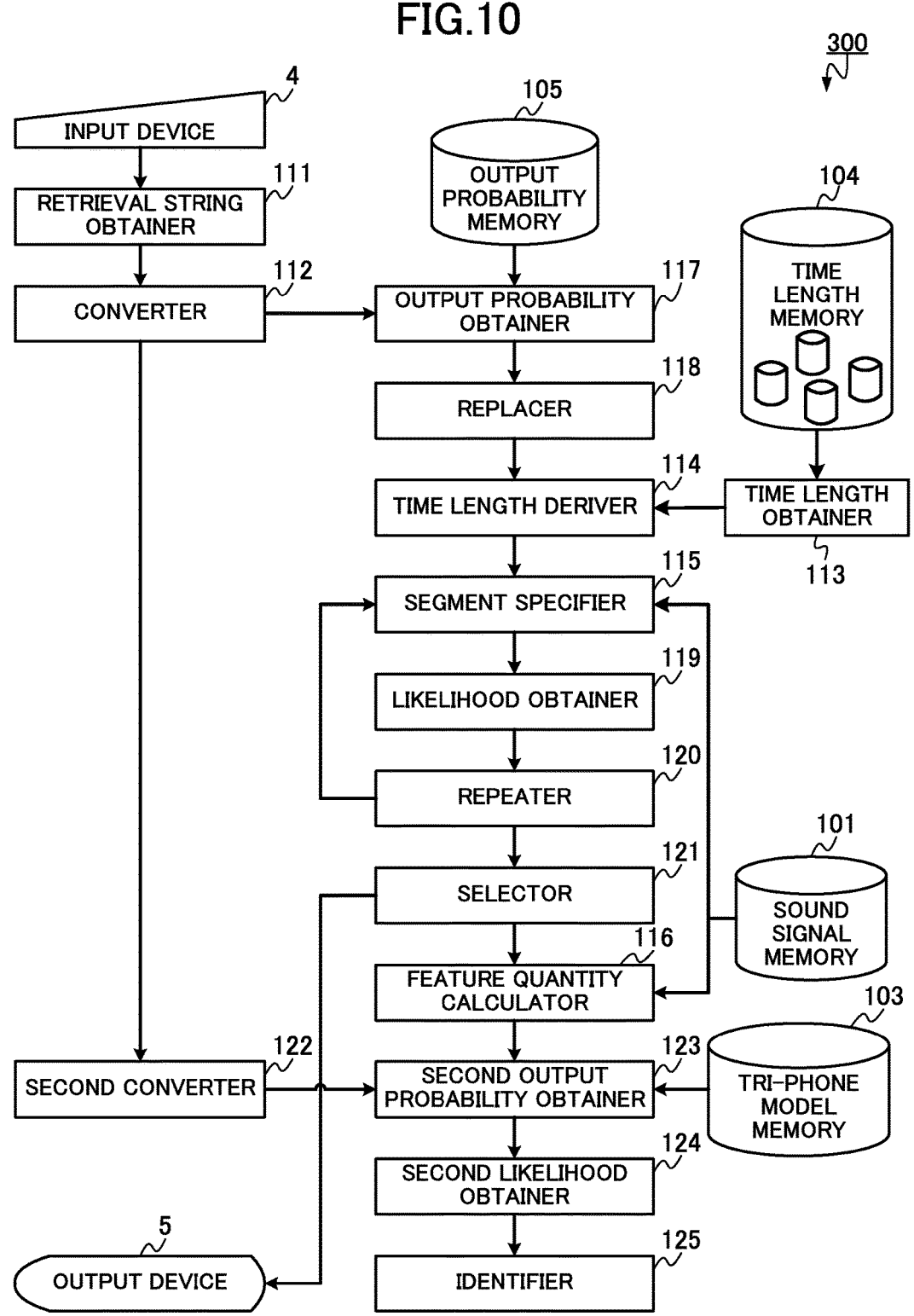
FIG. 10 is a diagram illustrating a functional structure of a voice retrieval apparatus according to a second embodiment of the present disclosure.

The voice retrieval apparatus 300 of the second embodiment employs a functional structure as illustrated in FIG. 10. The voice retrieval apparatus 300 does not include the mono-phone model memory 102 of the voice retrieval apparatus 100 of the first embodiment, but includes an output probability memory 105 instead. To obtain the output probability, the mono-phone model is necessary, but the output probability is obtained by another apparatus, and an obtained result is stored in the output probability memory 105 of the voice retrieval apparatus 300. Hence, the voice retrieval apparatus 300 needs no mono-phone model memory 102. The output probability memory 105 is constructed in the memory area of the external memory device 3. The difference from the first embodiment will be explained in detail below.

The output probability memory 105 stores, for each frame contained in the retrieval sound signal, each phoneme of the acoustic model and the output probability that the feature quantity of the retrieval sound signal is output from each phoneme, in association with each other. The acoustic model applied when another apparatus obtains the output probability is the mono-phone model applied at the time of preliminary selection. For example, a Japanese mono-phone contains a total of substantially 40 types of phoneme. The output probability memory 105 adds a phoneme that is silence to those 40 types of phoneme, and has groups of five types of utterance rate that are "fast", "slightly fast", "normal", "slightly slow", and "slow" relative to those phonemes. Hence, with respect to 615 states of 205 types of phoneme, a calculation result of the output probability corresponding to the retrieval term from the header of the retrieval sound signal to the last is stored in the output probability memory 105 beforehand as the retrieval index.

As for a process of calculating the output probability beforehand based on the mono-phone model, another information processing apparatus calculates the output probability, and the voice retrieval apparatus 300 obtains the result, and stores in the output probability memory 105.

The retrieval string obtainer 111 and the converter 112 are the same as those of the first embodiment.

When the converter 112 converts the retrieval string into the mono-phone phoneme string, the output probability obtainer 117 obtains, from the output probabilities stored in the output probability memory 105, the output probabilities that has each phoneme contained in the phoneme string and the frame stored in association with each other. More specifically, the output probability obtainer 117 obtains, for all frames of the retrieval sound signal, the output probability of phoneme necessary for retrieval from the output probabilities of all phonemes of the mono-phone model stored for each frame.

The replacer 118, the time length deriver 114, and the likelihood obtainer 119 are also the same as those of the first embodiment. The repeater 120 shifts the likelihood obtainment segment specified by the segment specifier 115 by the shift length S, and controls those components so as to repeat the processes by the segment specifier 115 and the likelihood obtainer 119. Next, the repeater 120 also controls the respective components so as to obtain the likelihood for each likelihood obtainment segment specifiable in the retrieval sound signal.

The selector 121, the feature quantity calculator 116, the second converter 122, the second output probability obtainer 123, the second likelihood obtainer 124, and the identifier 125 are also the same as those of the first embodiment.

As explained above, the voice retrieval apparatus 300 of the second embodiment does not calculate the output probability at the time of likelihood obtainment in the preliminary selection, but calculates the output probabilities across the whole retrieval sound signal, and stores as the retrieval index beforehand. Next, at the time of retrieval, the voice retrieval apparatus 300 utilizes the retrieval index to preliminary select candidates of a final result, and calculates, for only the segments left as the candidates, the output probability based on tri-phone phoneme model contained in the retrieval string. This speeds up a voice retrieval.

First Modified Example

In the first embodiment, as explained above with reference to FIG. 7, the selector 121 adds, for each time length, the x (10) number of likelihoods in the order of higher likelihood when selecting the time length with the highest likelihood, and selects the likelihood obtainment segment based on the time length that maximizes the addition value of the likelihoods. However, the way of selection is not limited to this scheme. In a first modified example, as exemplified in FIGS. 11A and 11B, based on the addition value of the likelihoods having undergone correction that is a multiplication by a weight coefficient that becomes large as the likelihood becomes high, a comparison is made for which likelihood of the likelihood obtainment segment is excellent and to which utterance rate such a likelihood obtainment segment corresponds.

FIG. 11B shows example weight coefficients, and a setting is made in such way that the higher the ranking of the likelihood is, the larger the weight coefficient becomes. FIG. 11A illustrates an example case in which a comparison is made based on a value obtained by multiplying the likelihood by the weight coefficient to compare which likelihood of the likelihood obtainment segment is excellent and to which utterance rate such a likelihood obtainment segment corresponds.

In the field of the pre-correction likelihood in FIG. 11A, 10 likelihoods selected by the selector 121 are sorted in the order of higher likelihood. In the field of the post-correction likelihood in FIG. 11A, the value obtained by multiplying the pre-correction likelihood by the weight coefficient is shown.

More specifically, the pre-correction likelihood (0.20) that is the first ranking for the "fast" utterance rate is multiplied by the weight coefficient (10) for the first-ranking likelihood in FIG. 11B, and thus the post-correction likelihood (2.00) is obtained. The pre-correction likelihood (0.17) that is the second ranking for the "fast" utterance rate is multiplied by the weight coefficient (9) for the second-ranking likelihood in FIG. 11B, and thus the post-correction likelihood (1.53) is obtained. Likewise, the process continues until the pre-correction likelihood (0.03) that is the 10th ranking is multiplied by the weight coefficient (1) for 10th-ranking likelihood in FIG. 11B, and the post-correction likelihood (0.33) is obtained. As for the "slightly fast", "normal", "slightly slow", and "slow" utterance rates, the similar processes are executed and the respective post-correction likelihoods are thus obtained.

Next, the values each obtained by adding the 10 likelihoods having undergone the correction that is a multiplication by the weight coefficient are compared one another, and the group of the likelihood obtainment segments corresponding to the utterance rate with the highest total value is selected as the final candidate segment. In the case illustrated in FIGS. 11A and 11B, since the total value (17.0) of the likelihoods having undergone the correction in the "slightly slow" group is the maximum value, the group of the likelihood obtainment segments for "slightly slow" is selected as the final candidate segment.

According to this process, the utterance time length appropriate for the segment with the higher-ranking likelihood is selected, and thus the retrieval precision for the segment with a higher-ranking likelihood is improved. This is more suitable for a case in which whether or not a retrieval query is contained in the sound signals with large number of noises is determined than a case in which a retrieval query is retrieved across the whole retrieval sound signal without any omission.

Second Modified Example

As explained in the above embodiments, as a selection scheme of the selector 121 to select the final candidate segment, when the time length is selected based on the addition value of the likelihoods, if there is a segment that has a remarkably high likelihood, the addition value of the likelihoods becomes large. Hence, an improper determination may be made for a selection of the optimized utterance time length relative to the whole sound signal. In particular, when the number x for the selection by the selector 121 is small, an improper determination is likely to occur. Hence, instead of applying the absolute value of the likelihood, a relative ranking among the likelihood obtainment segments is compared based on the five types of time length, and the group of likelihood obtainment segments based on the utterance time length is selected.

A specific example will be explained with reference to FIG. 12. FIG. 12 shows a ranking among five groups corresponding to the utterance rate in the order of higher likelihood in FIG. 7. In the row for the first ranking in FIG. 7, the likelihood for "slightly slow" is the highest (0.55). Hence, this likelihood is determined as the first. Next, the likelihood for "normal" is the second highest (0.4). Hence, this likelihood is determined as the second. In this way, the likelihood among the groups is compared with respect to the first ranking in each group, and ranking is performed. In the second row of second ranking, the likelihood for "normal" is the highest (0.35). Hence, this likelihood is determined as the first. The likelihood for "slightly slow" is the second highest (0.32). Hence, this likelihood is determined as the second. Hence, for each row from the first ranking likelihood to the 10th ranking likelihood, the ranking is performed among the groups in the order of higher likelihood. Next, the totals of respective rankings are compared one another, and the group that has the smallest total value is selected. In the example case illustrated in FIG. 12, since the total value of the ranking for "slightly slow" is the smallest, 10 likelihood obtainment segments based on the time length corresponding to "slightly slow" are selected as the final candidate segments.

According to this process, the voice retrieval apparatus can prevent an improper selection of the utterance time length when there is a segment that has a remarkably high likelihood. Therefore, the retrieval precision is improved throughout the whole retrieval sound signal.

Third Modified Example

According to the second modified example, a comparison is made for the likelihood in the same ranking among the utterance rates, and a comparison is made for which likelihood is relatively excellent and to which utterance rate such a likelihood corresponds. According to this scheme, however, the segments with a high likelihood may be concentrated in a short segment (for example, 10 minutes) in the 1-hour sound signal. In this case, an excellent utterance rate on average may be not selected across the whole segments that is long in the sound signal.

Hence, as a scheme of the selector 121 to select the final candidate segment, the following selection scheme is also applicable. That is, the sound signal is divided into a predetermined number N of segments. As for how to divide the signal, for example, the sound signal may be divided into 100 segments, or may be divided into segments based on a predetermined time length (for example, a time length that is 1 minute). In each divided segment, ranking is performed as for which likelihood obtainment segment has the higher likelihood and to which time length such a likelihood obtainment segment corresponds as the utterance time length. Next, the likelihood obtainment segment based on the time length with the highest average ranking among the N number of segments is selected as the final candidate likelihood obtainment segment.

A specific example will be explained with reference to FIGS. 13A and 13B. In FIGS. 13A and 13B, a time length T (for example, 10 minutes) of the sound signal is divided into 10 segments for each 1 minute. FIG. 13A shows the highest likelihood for each utterance rate among the 10 segments. FIG. 13B shows a ranking indicating, for each segment, to which utterance rate the highest likelihood corresponds.

In FIG. 13A, as for the ranking in the first segment (first 1 minute), the likelihood (0.55) for "slightly slow" is the highest, thus determined as the first. The likelihood (0.40) for "normal" is the second highest, thus determined as the second. The likelihood (0.35) for "slightly fast" is the third, the likelihood (0.30) for "slow" is the fourth, and the likelihood (0.20) for "fast" is the fifth. In the second segment (second 1 minute), the likelihood (0.35) for "normal" is the highest, thus determined as the first. The likelihood (0.32) for "slightly slow" is the second highest, thus determined as the second. The likelihood (0.21) for "slightly fast" is the third, the likelihood (0.18) for "slow" is the fourth, and the likelihood (0.17) for "fast" is the fifth. As explained above, in each segment, the likelihoods corresponding to the respective utterance rates are compared one another to perform ranking, and such a raking is performed from the first segment to the 10th segment. Next, the total value of the ranking is compared with that of another ranking, and the smallest total value is selected. In the example case illustrated in FIG. 13B, since the ranking of "slightly slow" has the smallest total value, the likelihood obtainment segment based on the time length corresponding to "slightly slow" is selected as the final candidate segment.

According to this process, an improper selection of the utterance rate when there is a segment that has a remarkably high likelihood is preventable. Hence, the retrieval precision is improved across the whole segments in the retrieval sound signal.

In the first and second embodiments, the explanation was given of an example case in which the utterance rate of phoneme continuous time length is classified into five types of group, but the present disclosure is not limited to this example case. The more the number of classifications for a phoneme continuous time length is, the more the retrieval precision improves, but a process load increases, and thus a necessary process time increases. According to the preliminary retrieval based on the mono-phone model, however, a process load is little relative to a retrieval based on the tri-phone model. Hence, although the number of groups for the continuous time length in the mono-phone model is increased by 10 times, the total time for the voice retrieval process hardly increases. In consideration of this tendency, the number of groups for the continuous time length is desirably determined in accordance with the requisition for the specification of the apparatus.

In the foregoing embodiments, the explanation was given of an example case in which a retrieval term is input from the input device 4 as text data, but a retrieval term may be input from the microphone of a voice recognition device as voice data, and the voice recognition device may recognize the input retrieval term.

In addition, in the foregoing embodiments, the explanation was given of an example case in which the utterance rate information (change rate for continuous time length) is input from the input device 4. However, a part of sound signal may be analyzed, the utterance rate may be estimated based on pitch information contained in voices per a unit time, and the change rate to the continuous time length may be determined based on such estimation.

Still further, with respect to the explanation with reference to the flowchart of FIG. 8 for the retrieval process in the first and second embodiments, the explanation was given on an example method of simultaneously processing the five groups of phoneme continuous time lengths in the same process loop in the preliminary selection. However, the present disclosure is not limited to this method as long as the process flow is to refine the candidate likelihood obtainment segments in the preliminary selection. For example, based on the continuous time length corresponding to a single utterance rate (for example, fast), the x number of segments may be selected as preliminary selection candidates. Next, based on the continuous time length corresponding to a different utterance rate (for example, slightly fast), the x number of segments may be selected as preliminary selection candidates. Subsequently, the preliminary selection may be executed for each utterance rate, and a determination may be made to which utterance rate the likelihood obtainment segment to be finally selected corresponds.

Yet still further, in the foregoing embodiments, the explanation was given of an example case in which the selector 121 selects each x number of segments in the order of higher likelihood in each P number of likelihood obtainment segments for each of five time lengths corresponding to the utterance rates. However, how to select the segment is not limited to this example case. For example, a specific likelihood value may be set as a threshold, and the likelihood obtainment segment equal to or larger than the threshold may be selected. As for the identification of the final estimation segment by the identifier 125, instead of identifying the predetermined number of segments in the order of higher second likelihood, a segment that has the likelihood equal to or larger than a predetermined value may be identified as the estimation segment.

Moreover, the explanation was given of an example case in which the selector 121 selects the time length that has the highest likelihood in the five time lengths, and then the final process based on the tri-phone model is performed, but when there is a leeway for the process time, the selection of the time length may be omitted.

In an application that does not require a highly precise retrieval, the Lower-Bounding process may be omitted. In an application that requires a highly precise retrieval, when retrieval is performed based on the continuous time length corresponding to various types of utterance rate, the Lower-Bounding process may be omitted in some cases.

Still further, although the voice retrieval apparatus employing the structure to accomplish the functions of the present disclosure beforehand can be provided, by applying a program, conventional personal computer, information terminal device, and the like may be caused to function as the voice retrieval apparatus of the present disclosure. That is, conventional personal computer, information terminal device, and the like can be made to function as a voice retrieval apparatus of the present disclosure by applying a program for realizing the respective functional structures of the voice retrieval apparatuses 100, 300 exemplified in the foregoing embodiments to such devices in a manner executable by a CPU, and the like which control such devices. Moreover, a voice retrieval method according to the present disclosure can be carried out by the voice retrieval apparatus.

How to apply such a program is optional. For example, in order to apply the program, the program may be stored in a non-transitory computer-readable recording medium (for example, a Compact Disc Read-Only Memory (CD-ROM), a Digital Versatile Disc (DVD), a Magneto Optical disc (MO), and the like), or may be stored in a storage over a network like the Internet, and may be downloaded to apply the program.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:
1. A voice retrieval apparatus comprising:
a processor;
a memory that records a sound signal subjected to retrieval; and
an output device comprising a screen,
wherein the processor executes following processes:
 a converting process of converting a retrieval string into a phoneme string;
 a time length obtaining process of obtaining, from a database that stores continuous time length data on a phoneme, a continuous time length for each phoneme contained in the phoneme string converted in the converting process;
 a time length deriving process of deriving, based on the continuous time length obtained in the time length obtaining process, a plurality of time lengths corresponding to a plurality of utterance rates different from one another as candidate utterance time lengths of voices corresponding to the retrieval string;
 a segment specifying process of specifying, for each of the plurality of time lengths, a plurality of likelihood obtainment segments within the sound signal subjected to retrieval, each of the plurality of likelihood obtainment segments having the time length derived in the time length deriving process;
 a likelihood obtaining process of obtaining a likelihood showing a plausibility that the likelihood obtainment segment specified in the segment specifying process is a segment where voices corresponding to the retrieval string are uttered;
 an identifying process of identifying, based on the likelihood obtained in the likelihood obtaining process, an estimation segment where, within the sound signal subjected to retrieval, utterance of voices corresponding the retrieval string is estimated, the estimation segment being identified for each of the likelihood obtainment segments specified in the segment specifying process; and
 a displaying process of displaying on the screen of the output device, the estimation segment identified in the identifying process, wherein:
the processor further executes a selecting process of selecting, based on the likelihood obtained in the likelihood obtaining process, one of the plurality of time lengths; and
in the identifying process, the estimation segment is identified among the likelihood obtainment segments with the selected time length based on the likelihood obtained for the likelihood obtainment segment with the selected time length.

2. The voice retrieval apparatus according to claim 1, wherein in the selecting process, an addition value obtained by adding together a predetermined number of the likelihoods obtained for the likelihood obtainment segments with a same time length in an order of higher likelihood is obtained for each of the plurality of time lengths, and the respective obtained addition values are compared one another, and the time length that has a maximum addition value is selected from the plurality of time lengths.

3. The voice retrieval apparatus according to claim 2, wherein in the selecting process, the addition value is obtained by adding together the likelihoods obtained for the likelihood obtainment segments with the same time length, the likelihood to be added together being multiplied by a weight coefficient, wherein a higher the likelihood is, a larger the weight coefficient becomes.

4. The voice retrieval apparatus according to claim 1, wherein:
in the converting process, phonemes of an acoustic model that does not depend on adjacent phonemes are arranged in sequence to convert the retrieval string into the phoneme string;
in the likelihood obtaining process, based on the phoneme string, the likelihood of the likelihood obtainment segment specified in the segment specifying process is obtained;
in the selecting process, based on the likelihood obtained in the likelihood obtaining process, a plurality of candidates for the estimation segment is selected among the likelihood obtainment segment specified in the segment specifying process;
the processor further executes:
a second converting process of arranging phonemes of a second acoustic model that depends on adjacent phonemes in sequence, and converting the retrieval string into a second phoneme string; and
a second likelihood obtaining process of obtaining, based on the second phoneme string for each of the plurality of candidates selected in the selecting process, a second likelihood showing a plausibility that the selected segment as the candidate of the estimation segment in the selecting process is a segment where voices corresponding to the retrieval string are uttered; and
in the identifying process, based on the second likelihood obtained in the second likelihood obtaining process, the estimation segment is identified from the plurality of candidates selected in the selecting process.

5. The voice retrieval apparatus according to claim 4, wherein in the selecting process, the plurality of candidates of the estimation segment is selected by selecting, from the likelihood obtainment segments beginning in the segment with a predetermined selection time length, the likelihood obtainment segment one by one with a maximum likelihood for each of the predetermined selection time lengths in the likelihood obtainment segments specified in the segment specifying process.

6. A voice retrieval apparatus comprising:
a processor;
a memory that records a sound signal subjected to retrieval; and
an output device comprising a screen,
wherein the processor executes following processes:
a converting process of converting a retrieval string into a phoneme string;
a time length obtaining process of obtaining, from a database that stores continuous time length data on a phoneme, a continuous time length for each phoneme contained in the phoneme string converted in the converting process;
a time length deriving process of deriving, based on the continuous time length obtained in the time length obtaining process, a plurality of time lengths corresponding to a plurality of utterance rates different from one another as candidate utterance time lengths of voices corresponding to the retrieval string;
a segment specifying process of specifying, for each of the plurality of time lengths, a plurality of likelihood obtainment segments within the sound signal subjected to retrieval, each of the plurality of likelihood obtainment segments having the time length derived in the time length deriving process;
a likelihood obtaining process of obtaining a likelihood showing a plausibility that the likelihood obtainment segment specified in the segment specifying process is a segment where voices corresponding to the retrieval string are uttered;
an identifying process of identifying, based on the likelihood obtained in the likelihood obtaining process, an estimation segment where, within the sound signal subjected to retrieval, utterance of voices corresponding the retrieval string is estimated, the estimation segment being identified for each of the likelihood obtainment segments specified in the segment specifying process; and
a displaying process of displaying on the screen of the output device, the estimation segment identified in the identifying process, wherein:
the processor further executes:
a feature quantity calculating process of calculating a feature quantity of the sound signal subjected to retrieval in the likelihood obtainment segment specified in the segment specifying process for each frame that is a time window to compare the sound signal with an acoustic model; and
an output probability obtaining process of obtaining, for each of the frames, an output probability that the feature quantity of the sound signal subjected to retrieval is output from each phoneme contained in the phoneme string, and
in the likelihood obtaining process, respective values that are each a logarithm of the output probability obtained for each of the frames contained in the likelihood obtainment segment specified in the segment specifying process are added to obtain the likelihood of the likelihood obtainment segment.

7. The voice retrieval apparatus according to claim 6, further comprising an output probability memory that stores, in association with each other for each of the frames contained in the sound signal subjected to retrieval, each phoneme state of an acoustic model, and, the output probability that the feature quantity of the sound signal subjected to retrieval is output from each phoneme state created from the acoustic model,
wherein in the output probability obtaining process, when the retrieval string is converted into the phoneme string in the converting process, the output probability stored in association with each phoneme state contained in the phoneme string is obtained from the output probabilities stored in the output probability memory for each of the frames contained in the likelihood obtainment segment.

8. The voice retrieval apparatus according to claim 7, wherein:
the processor further executes a replacing process of replacing each of the output probabilities obtained in the output probability obtaining process for each of the frames with a maximum output probability in the frame, an N1 number of frames previous to the frame, and an N2 number of frames subsequent to the frame;
the symbols N1 and N2 are each a natural number including zero, but either the N1 or the N2 is not zero; and
in the likelihood obtaining process, based on the output probability having undergone replacement in the replacing process, the likelihood of the likelihood obtainment segment specified in the segment specifying process is obtained.

9. A voice retrieval method by a voice retrieval apparatus comprising a memory that records a sound signal subjected to retrieval, the method comprising:
a converting step of converting a retrieval string into a phoneme string;
a time length obtaining step of obtaining, from a database that stores continuous time length data on a phoneme, a continuous time length for each phoneme contained in the phoneme string converted in the converting step;
a time length deriving step of deriving, based on the continuous time length obtained in the time length obtaining step, a plurality of time lengths corresponding to a plurality of utterance rates different from one another as candidate utterance time lengths of voices corresponding to the retrieval string;
a segment specifying step of specifying, for each of the plurality of time lengths, a plurality of likelihood obtainment segments within the sound signal subjected to retrieval, each of the plurality of likelihood obtainment segments having the time length derived in the time length deriving step;
a likelihood obtaining step of obtaining a likelihood showing a plausibility that the likelihood obtainment segment specified in the segment specifying step is a segment where voices corresponding to the retrieval string are uttered;
an identifying step of identifying, based on the likelihood obtained in the likelihood obtaining step, an estimation segment where, within the sound signal subjected to retrieval, utterance of voices corresponding the retrieval string is estimated, the estimation segment being identified for each of the likelihood obtainment segments specified in the segment specifying step; and
a displaying step of displaying on a screen of an output device, the estimation segment identified in the identifying step, wherein:
the voice retrieval method further comprises a selecting step of selecting, based on the likelihood obtained in the likelihood obtaining step, one of the plurality of time lengths; and
in the identifying step, the estimation segment is identified among the likelihood obtainment segments with the selected time length based on the likelihood obtained for the likelihood obtainment segment with the selected time length.

10. The voice retrieval method according to claim 9, wherein in the selecting step, an addition value obtained by adding together a predetermined number of the likelihoods obtained for the likelihood obtainment segments with a same time length in an order of higher likelihood is obtained for each of the plurality of time lengths, and the respective obtained addition values are compared one another, and the time length that has a maximum addition value is selected from the plurality of time lengths.

11. The voice retrieval method according to claim 10, wherein in the selecting step, the addition value is obtained by adding together the likelihoods obtained for the likelihood obtainment segments with the same time length, the likelihood to be added together being multiplied by a weight coefficient, wherein a higher the likelihood is, a larger the weight coefficient becomes.

12. The voice retrieval method according to claim 9, wherein:
in the converting step, phonemes of an acoustic model that does not depend on adjacent phonemes are arranged in sequence to convert the retrieval string into the phoneme string;
in the likelihood obtaining step, based on the phoneme string, the likelihood of the likelihood obtainment segment specified in the segment specifying step is obtained;
in the selecting step, based on the likelihood obtained in the likelihood obtaining step, a plurality of candidates for the estimation segment is selected among the likelihood obtainment segment specified in the segment specifying step;
the method further comprises:
a second converting step of arranging phonemes of a second acoustic model that depends on adjacent phonemes in sequence, and converting the retrieval string into a second phoneme string; and
a second likelihood obtaining step of obtaining, based on the second phoneme string for each of the plurality of candidates selected in the selecting step, a second likelihood showing a plausibility that the selected segment as the candidate of the estimation segment in the selecting step is a segment where voices corresponding to the retrieval string are uttered; and
in the identifying step, based on the second likelihood obtained in the second likelihood obtaining step, the estimation segment is identified among the plurality of candidates selected in the selecting step.

13. The voice retrieval method according to claim 12, wherein in the selecting step, the plurality of candidates of the estimation segment is selected by selecting, from the likelihood obtainment segments beginning in the segment with a predetermined selection time length, the likelihood obtainment segment one by one with a maximum likelihood for each of the predetermined selection time lengths in the likelihood obtainment segments specified in the segment specifying step.

14. A voice retrieval method by a voice retrieval apparatus comprising a memory that records a sound signal subjected to retrieval, the method comprising:
a converting step of converting a retrieval string into a phoneme string;
a time length obtaining step of obtaining, from a database that stores continuous time length data on a phoneme, a continuous time length for each phoneme contained in the phoneme string converted in the converting step;
a time length deriving step of deriving, based on the continuous time length obtained in the time length obtaining step, a plurality of time lengths corresponding to a plurality of utterance rates different from one another as candidate utterance time lengths of voices corresponding to the retrieval string;
a segment specifying step of specifying, for each of the plurality of time lengths, a plurality of likelihood obtainment segments within the sound signal subjected to retrieval, each of the plurality of likelihood obtainment segments having the time length derived in the time length deriving step;
a likelihood obtaining step of obtaining a likelihood showing a plausibility that the likelihood obtainment segment specified in the segment specifying step is a segment where voices corresponding to the retrieval string are uttered;
an identifying step of identifying, based on the likelihood obtained in the likelihood obtaining step, an estimation segment where, within the sound signal subjected to retrieval, utterance of voices corresponding the retrieval string is estimated, the estimation segment being identified for each of the likelihood obtainment segments specified in the segment specifying step; and
a displaying step of displaying on a screen of an output device, the estimation segment identified in the identifying step, wherein:
the voice retrieval method further comprises:
a feature quantity calculating step of calculating a feature quantity of the sound signal subjected to retrieval in the likelihood obtainment segment specified in the segment specifying step for each frame that is a time window to compare the sound signal with an acoustic model; and
an output probability obtaining step of obtaining, for each frame, an output probability that the feature quantity of the sound signal subjected to retrieval is output from each phoneme contained in the phoneme string, and
in the likelihood obtaining step, respective values that are each a logarithm of the output probability obtained for each frame contained in the likelihood obtainment segment specified in the segment specifying step are added to obtain the likelihood of the likelihood obtainment segment.

15. The voice retrieval method according to claim 14, wherein:
the voice retrieval apparatus further comprises an output probability memory that stores, in association with each other for each of the frames contained in the sound signal subjected to retrieval, each phoneme state of an acoustic model, and, the output probability that the feature quantity of the sound signal subjected to retrieval is output from each phoneme state created from the acoustic model,
wherein in the output probability obtaining step, when the retrieval string is converted into the phoneme string in the converting step, the output probability stored in association with each phoneme state contained in the phoneme string is obtained from the output probabilities stored in the output probability memory for each of the frames contained in the likelihood obtainment segment.

16. The voice retrieval method according to claim 15, further comprising a replacing step of replacing each of the output probabilities obtained in the output probability obtaining step for each of the frames with a maximum output probability in the frame, an N1 number of frames previous to the frame, and an N2 number of frames subsequent to the frame, wherein:

the symbols N1 and N2 are each a natural number including zero, but either the N1 or the N2 is not zero; and
in the likelihood obtaining step, based on the output probability having undergone replacement in the replacing step, the likelihood of the likelihood obtainment segment specified in the segment specifying step is obtained.

17. A non-transitory recording medium having recorded therein a program that causes a computer of a voice retrieval apparatus including a memory recording a sound signal subjected to retrieval to execute:
a converting process of converting a retrieval string into a phoneme string;
a time length obtaining process of obtaining, from a database that stores continuous time length data on a phoneme, a continuous time length for each phoneme contained in the phoneme string converted in the converting process;
a time length deriving process of deriving, based on the continuous time length obtained in the time length obtaining process, a plurality of time lengths corresponding to a plurality of utterance rates different from one another as candidate utterance time lengths of voices corresponding to the retrieval string;
a segment specifying process of specifying, for each of the plurality of time lengths, a plurality of likelihood obtainment segments within the sound signal subjected to retrieval, each of the plurality of likelihood obtainment segments having the time length derived in the time length deriving process;
a likelihood obtaining process of obtaining a likelihood showing a plausibility that the likelihood obtainment segment specified in the segment specifying process is a segment where voices corresponding to the retrieval string are uttered;
an identifying process of identifying, based on the likelihood obtained in the likelihood obtaining process, an estimation segment where, within the sound signal subjected to retrieval, utterance of voices corresponding the retrieval string is estimated, the estimation segment being identified for each of the likelihood obtainment segments specified in the segment specifying process; and
a displaying process of displaying, on a screen of an output device, the estimation segment identified in the identifying process, wherein:
the program further causes the computer to execute a selecting process of selecting one of the plurality of time lengths based on the likelihood obtained in the likelihood obtaining process; and
in the identifying process, the estimation segment is identified among the likelihood obtainment segments with the selected time length based on the likelihood obtained for the likelihood obtainment segment with the selected time length.

18. A non-transitory recording medium having recorded therein a program that causes a computer of a voice retrieval apparatus including a memory recording a sound signal subjected to retrieval to execute:
a converting process of converting a retrieval string into a phoneme string;
a time length obtaining process of obtaining, from a database that stores continuous time length data on a phoneme, a continuous time length for each phoneme contained in the phoneme string converted in the converting process;

a time length deriving process of deriving, based on the continuous time length obtained in the time length obtaining process, a plurality of time lengths corresponding to a plurality of utterance rates different from one another as candidate utterance time lengths of voices corresponding to the retrieval string;

a segment specifying process of specifying, for each of the plurality of time lengths, a plurality of likelihood obtainment segments within the sound signal subjected to retrieval, each of the plurality of likelihood obtainment segments having the time length derived in the time length deriving process;

a likelihood obtaining process of obtaining a likelihood showing a plausibility that the likelihood obtainment segment specified in the segment specifying process is a segment where voices corresponding to the retrieval string are uttered;

an identifying process of identifying, based on the likelihood obtained in the likelihood obtaining process, an estimation segment where, within the sound signal subjected to retrieval, utterance of voices corresponding the retrieval string is estimated, the estimation segment being identified for each of the likelihood obtainment segments specified in the segment specifying process; and a displaying process of displaying, on a screen of an output device, the estimation segment identified in the identifying process, wherein:

the program further causes the computer to execute:

a feature quantity calculating process of calculating a feature quantity of the sound signal subjected to retrieval in the likelihood obtainment segment specified in the segment specifying process for each frame that is a time window to compare the sound signal with an acoustic model; and an output probability obtaining process of obtaining, for each of the frames, an output probability that the feature quantity of the sound signal subjected to retrieval is output from each phoneme contained in the phoneme string, and in the likelihood obtaining process, respective values that are each a logarithm of the output probability obtained for each of the frames contained in the likelihood obtainment segment specified in the segment specifying process are added to obtain the likelihood of the likelihood obtainment segment.

* * * * *